US006414088B1

(12) United States Patent
Tanaka et al.

(10) Patent No.: US 6,414,088 B1
(45) Date of Patent: Jul. 2, 2002

(54) RESIN COMPOSITIONS AND USE OF THE SAME

(75) Inventors: Yasuo Tanaka; Mamoru Kagami; Masahiro Sugi, all of Ichihara (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/609,328

(22) Filed: Jun. 30, 2000

Related U.S. Application Data

(63) Continuation of application No. 08/836,610, filed as application No. PCT/JP96/02609 on Sep. 12, 1996, now abandoned.

(30) Foreign Application Priority Data

Sep. 13, 1995 (JP) ............................................. 7-235824
Sep. 14, 1995 (JP) ............................................. 7-236771

(51) Int. Cl.$^7$ .......................... C08L 23/00; C08L 23/04
(52) U.S. Cl. ....................................... 525/191; 525/240
(58) Field of Search .................................. 525/191, 240

(56) References Cited

U.S. PATENT DOCUMENTS

| 4,303,710 A | | 12/1981 | Bullard et al. |
| 4,357,191 A | | 11/1982 | Bullard et al. |
| 4,793,956 A | | 12/1988 | Nogiwa et al. |
| 4,842,922 A | | 6/1989 | Krupp et al. |
| 5,243,001 A | | 9/1993 | Winter et al. |
| 5,376,439 A | * | 12/1994 | Hodgson et al. ............ 428/220 |
| 5,656,696 A | * | 8/1997 | Yamamoto et al. ......... 525/240 |

FOREIGN PATENT DOCUMENTS

| JP | 1501950 | 1/1987 |
| JP | 1502036 | 1/1987 |
| JP | 3207704 | 10/1989 |

* cited by examiner

Primary Examiner—Nathan M. Nutter
(74) Attorney, Agent, or Firm—Sherman & Shalloway

(57) ABSTRACT

The resin composition of the invention is a composition which includes 100 parts by weight of a polyethylene resin (A) and 2 to 5,000 parts by weight of a linear ethylene/a-olefin random copolymer (B) which includes ethylene and an a-olefin of 6 to 20 carbon atoms, wherein the polyethylene resin (A) has (a) MFR (ASTM D 1238, 190° C., load of 2.16 kg) of 0.1 to 200 g/10 min and (b) a density of 0.901 to 0.970 g/cm$^3$; and the copolymer (B) has (a) a density of 0.870 to 0.900 g/cm$^3$, (b) an intrinsic viscosity ($\eta$), as measured in decalin at 135° C., of 0.3 to 3.0 dl/g, (c) a glass transition temperature (Tg) of not higher than −50° C., (d) a crystallinity, as measured by X-ray diffractometry, of less than 40%, (e) a molecular weight distribution (Mw/Mn), as measured by GPC, of not more than 3.0, (f) a B value, as determined by the $^{13}$C-NMR spectrum and a specific equation, of 1.0 to 1.4, and (g) a ratio g$\eta$* of more than 0.95 (g$\eta$*=($\eta$)/($\eta$)$_{blank}$, ($\eta$): intrinsic viscosity of this copolymer determined in the property (b), ($\eta$)$_{blank}$: intrinsic viscosity of a linear ethylene/propylene copolymer having the same weight-average molecular weight (measured by a light scattering method) as this copolymer and having an ethylene content of 70% by mol). This resin composition can provide molded products of excellent pliability and tensile properties.

15 Claims, No Drawings

RESIN COMPOSITIONS AND USE OF THE SAME

This is a continuation of application Ser. No. 08/836,610, filed May 13, 1997, which is now abandoned and is a national stage entry of PCT/JP96/02609, filed Sep. 12, 1996; application Ser. No. 08/836,610 is incorporated herein in its entirety by reference thereto.

FIELD OF THE INVENTION

The present invention relates to a resin composition of polyethylene resin type, which is capable of providing molded products of excellent pliability (flexibility) and tensile properties.

Particularly, the invention relates to a soft resin composition containing a polyethylene resin, which has good moldability and is capable of providing molded products of excellent in pliabiity (flexibility) and strength properties.

The invention also relates to a polyethylene resin composition which is suitable mainly for packaging films and has such advantages that the composition has better film moldability as compared with conventional polyethylene resin compositions so that films can be formed at a high speed, and the composition can provide films excellent not only in mechanical strength properties (particularly tensile properties and tear strength), low-temperature heat sealability and heat-sealing stability but also in slip properties and blocking resistance thereby being excellent in suitability for high-speed filling upon packaging by automatic filling machines.

BACKGROUND OF THE INVENTION

Examples of polyethylene resins include high-pressure low-density polyethylene resins, high-density polyethylene resins and linear low-density polyethylene resins including ethylene/α-olefin copolymers.

Of these, the low-density polyethylene resins are widely used for gaskets for injection molding machines, various packings, tubes and sheets because of their good pliability, heat resistance and mechanical strength properties.

The conventional low-density polyethylene resins have good heat resistance but show insufficient flexibility, so that they are desired to be improved in the flexibility. Besides, improvement in the mechanical strength properties, e.g., tensile properties, is also desired.

In order to improve flexibility, a method of blending the low-density polyethylene resins with various elastomers (e.g., ethylene/propylene copolymer rubber or ethylene/1-butene copolymer rubber) has been proposed.

When the low-density polyethylenes and the conventional ethylene elastomers are blended, the flexibility and the tensile properties (stress at break, elongation at break) are improved, but the level of the improvement in the tensile properties is not satisfactory.

Accordingly, development of a polyethylene resin composition capable of providing molded products of excellent in flexibility and mechanical strength properties such as tensile properties and also showing high flowability suitable for various molding methods is desired.

Of the aforesaid polyethylene resins, high-pressure low-density polyethylene resins, high-density polyethylene resins and linear low-density polyethylene resins including ethylene/α-olefin copolymers are molded into films, and the films are conventionally applied to various uses such as packaging of articles.

Of the polyethylene films, films of the linear low-density polyethylene resins including ethylene/α-olefin copolymers are used as sealants for various packaging materials, because the linear low-density polyethylene resins as film materials can be made at low energy consumpsion (i.e., small production cost), as compared with the conventional high-pressure low-density polyethylene resins and these films are excellent in mechanical properties such as tear strength and impact strength as well as in heat sealability through contaminants and hot tack properties.

In the uses for packaging, films are required to have suitability for high-speed filling upon packaging by the automatic filling machines, but the films made of only the linear low-density ethylene/α-olefin copolymers are not always satisfactory in the high-speed filling suitability and handling properties.

Accordingly, development of an improved resin capable of providing films having better low-temperature heat sealability, heat-sealing stability, slip properties and blocking resistance is desired.

The linear low-density ethylene/α-olefin copolymer has low melt tension for their molecular weight as compared with the high-pressure polyethylenes. Therefore, the linear low-density ethylene/α-olefin copolymer has a drawback in that, when it is formed into films at a high-speed by inflation molding, there resides problems in that rocking or breakage of bubbles is liable to occur. Further, because of poor branching in the molecular chains, the linear low-density ethylene/α-olefin copolymers have poor flowability in high shear region.

In order to solve such problems as mentioned above, various compositions and films have been proposed. For example, a composition wherein an ethylene/α-olefin copolymer is compounded with a low-crystalline ethylene copolymer having a density of not more than 0.905 g/cm$^3$ (Japanese Patent Laid-Open Publication No. 34145/1982) and a composition wherein an ethylene/α-olefin copolymer is compounded with an ethylene/vinyl acetate copolymer (Japanese Patent Laid-Open Publication No. 109543/1984) have been proposed. However, the above problems have not been solved yet by those compositions or films thereof, and there is room left for further improvement in melt tension, flowability in high shear region, low-temperature heat sealability, mechanical strength properties such as tensile properties and tear strength, transparency and blocking resistance.

OBJECT OF THE INVENTION

The present invention is intended to solve such problems associated with the prior art as mentioned above, and it is an object of the invention to provide a resin composition capable of providing molded products of excellent pliability (flexibility) and mechanical strength properties such as tensile properties.

It is another object of the invention to provide a soft resin composition containing a polyethylene resin, which has good moldability and can provide molded products of excellent pliability (flexibility) and mechanical strength properties such as tensile properties.

It is a further object of the invention to provide a polyethylene resin composition having excellent heat stability and high-speed moldability and capable of providing films having not only excellent in low-temperature heat sealability and heat-sealing stability but also in slip properties and blocking resistance thereby being excellent in suitability for high-speed filling upon packaging by automatic filling machines.

SUMMARY OF THE INVENTION

The resin composition of the present invention is a composition comprising:

a polyethylene resin (A) in an amount of 100 parts by weight; and a linear ethylene/(α-olefin random copolymer (B) comprising ethylene and an α-olefin of 6 to 20 carbon atoms, in an amount of 2 to 5,000 parts by weight (in other words, the composition contains 100 parts by weight of the ethylene/α-olefin random copolymer (B) and 2 to 4,900 parts by weight of the polyethylene resin (A)), wherein the polyethylene resin (A) has:
(a) a melt flow rate (MFR, ASTM D 1238, 190° C., a load of 2.16 kg) of 0.1 to 200 g/10 min; and
(b) a density of 0.901 to 0.970 g/cm³, and wherein the ethylene/α-olefin random copolymer (B) has:
(a) a density of 0.870 to 0.900 g/cm³;
(b) an intrinsic viscosity (η), as measured in decalin at 135° C., of 0.3 to 3.0 dl/g;
(c) a glass transition temperature (Tg) of not higher than −50° C.;
(d) a crystallinity, as measured by X-ray diffractometry, of less than 40%;
(e) a molecular weight distribution (Mw/Mn), as measured by GPC, of not more than 3.0;
(f) a B value, as determined by the $^{13}$C-NMR spectrum of 1.0 to 1.4; and
(g) a ratio gη* of the intrinsic viscosity (η) of this copolymer determined in the property (b) to the intrinsic Viscosity $(\eta)_{blank}$ of a linear ethylene/propylene copolymer having the same weight-average molecular weight (measured by a light scattering method) as this copolymer and having an ethylene content of 70% by mol, $(\eta)/\eta)_{blank}$, of more than 0.95, $$B=P_{OE}/(2P_O \cdot P_E)$$

wherein $P_E$ is a molar fraction of an ethylene component contained in the ethylene/α-olefin random copolymer, $P_O$ is a molar fraction of an α-olefin component contained therein, and $P_{OE}$ is a proportion of the number of ethylene/α-olefin alternating sequences to the number of all the dyad sequences.

The soft resin composition of the present invention is a composition comprising:

a polyethylene resin (A-α) in an amount of 100 parts by weight; and a linear ethylene/α-olefin random copolymer (B-α) comprising ethylene and an α-olefin of 6 to 20 carbon atoms, in an amount of 50 to 5000 parts by weight (in other words, the composition contains 100 parts by weight of the ethylene/α-olefin random copolymer (B-α) and 2 to 200 parts by weight of the polyethylene resin (A-α)), wherein the polyethylene resin (A-α) has:
(a) an MFR (MFR, ASTM D 1238, 190° C., load of 2.16 kg) of 1 to 150 g/10 min; and
(b) a density of 0.901 to 0.970 g/cm³, and wherein the ethylene/α-olefin random copolymer (B-α) has:
(a) a density of 0.870 to 0.900 g/cm³;
(b) an intrinsic viscosity (η), as measured in decalin at 135° C., of 0.3 to 3.0 dl/g;
(c) a glass transition temperature (Tg) of not higher than −50° C.;
(d) a crystallinity, as measured by X-ray diffractometry, of less than 40%;
(e) a molecular weight distribution (Mw/Mn), as measured by GPC, of not more than 3.0;
(f) a B value, as determined by the $^{13}$C-NMR spectrum of 1.0 to 1.4; and
(g) a ratio gη* of the intrinsic viscosity (η) of this copolymer determined in the property (b) to the intrinsic viscosity $(\eta)_{blank}$ of a linear ethylene/propylene copolymer having the same weight-average molecular weight (measured by a light scattering method) as this copolymer and having an ethylene content of 70% by mol, $(\eta)/(\eta)_{blank}$, of more than 0.95.

The polyethylene resin composition of the present invention is a composition comprising:

a polyethylene resin (A-β) in an amount of 100 parts by weight; and an ethylene/α-olefin random copolymer (B-β) comprising ethylene and an α-olefin of 6 to 20 carbon atoms in an amount of 2 to 66 parts by weight (in other words, the composition contains, based on 100 parts by weight of the total of the polyethylene resin (A-β) and the ethylene/α-olefin random copolymer (B-β), 60 to 98 parts by weight of the polyethylene resin (A-β) and the residue of the ethylene/α-olefin random copolymer (B-β)), wherein the polyethylene resin (A-β) is:
(a) a linear ethylene/α-olefin copolymer comprising ethylene and an α-olefin of 3 to 20 carbon atoms, and has:
(b) a density of 0.901 to 0.940 g/cm³; and
(c) a melt flow rate (MFR), as measured at 190° C. under a load of 2.16 kg, of 0.1 to 200 g/10 min, and wherein the ethylene/α-olefin random copolymer (B-β) has:
(a) a density of 0.870 to 0.900 g/cm³,
(b) a melt flow rate (MFR), as measured at 190° C. under a load of 2.16 kg, of 0.1 to 100 g/10 min;
(c) an intrinsic viscosity (η), as measured in decalin at 135° C., of 0.3 to 3.0 dl/g;
(d) a glass transition temperature (Tg) of not higher than −50° C.;
(e) a crystallinity, as measured by X-ray diffractometry, of less than 40%;
(f) a molecular weight distribution (Mw/Mn), as measured by GPC, of not more than 3.0;
(g) a B value, as determined by the $^{13}$C-NMR spectrum of 1.0 to 1.4; and
(h) a ratio gη* of the intrinsic viscosity (η) of this copolymer determined in the property (c) to the intrinsic viscosity $(\eta)_{blank}$ of a linear ethylene/propylene copolymer having the same weight-average molecular weight (measured by a light scattering method) as this copolymer and having an ethylene content of 70% by mol, $(\eta)/(\eta)_{blank}$, of more than 0.95.

In each of the above compositions, the ethylene/α-olefin random copolymer is preferably an ethylene/α-olefin random copolymer obtained by randomly copolymerizing ethylene and an α-olefin of 6 to 20 carbon atoms in the presence of a metallocene catalyst containing a metallocene compound represented by the following formula (III) or (IV):

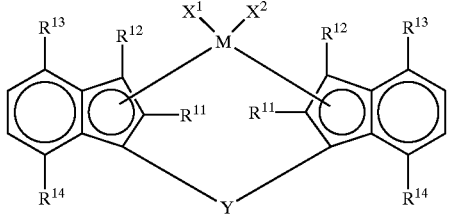

(III)

wherein M is a transition metal of Group IVB of the periodic table, $R^{11}$ and $R^{12}$ are each hydrogen, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group, $R^{13}$ and $R^{14}$ are each an alkyl group of 1 to 20 carbon atoms, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —S$_2$—, —NR$^7$—, —P(R$^7$)—, —P(O)(R$^7$)—, —BR$^7$— or —AlR$^7$— ($R^7$ is hydrogen, a halogen atom, a hydrocarbon group of 1 to 20 carbon atoms or a halogenated hydrocarbon group of 1 to 20 carbon atoms);

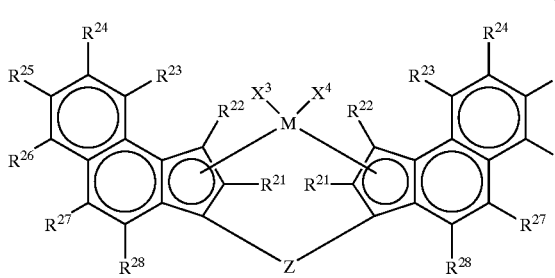

(IV)

wherein M is a transition metal of Group IVB of the periodic table, $R^{21}$ may be the same as or different from each other, and are each hydrogen, a halogen atom, an alkyl group of 1 to 10 carbon atoms which may be halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), p1 $R^{22}$ to $R^{28}$ are each the same as $R^{21}$, or adjacent two groups out of $R^{22}$ to $R^{28}$ may form an aromatic or aliphatic ring together with atoms to which they are bonded, $X^3$ and $X^4$ may be the same as or different from each other, and are each hydrogen, a halogen atom, OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and z is

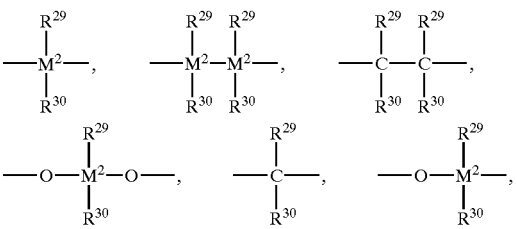

=BR$^{29}$, =AlR$^{29}$, —Ge—, —Sn—, —O—, —S—, =SO, —SO$_2$—, =NR$^{29}$, =CO, =PR$^{29}$ or =p (O) R$^{29}$ ($R^{29}$ and $R^{30}$ may be the same as or different from each other, and they are each hydrogen, a halogen atom, an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an alkylaryl group of 7 to 40 carbon atoms, an arylalkenyl group of 8 to 40 carbon atoms or an alkylaryl group of 7 to 40 carbon atoms, or $R^{29}$ and $R^{30}$ may form a ring together with atoms to which they are bonded, and $M^2$ is silicon, germanium or tin atom).

The film of the present invention is preferably formed from the above resin compositions, particularly the polyethylene resin composition.

In the present invention, the film is preferably formed by inflation molding.

The resin composition of the invention can provides molded products excellent in pliability and tensile properties.

The soft resin composition of the invention can provide molded products excellent in pliability and strength properties and also has excellent moldability.

The polyethylene resin composition of the invention is suitable mainly for packaging films, has better film moldability as compared with conventional polyethylene resin compositions so that films can be formed at a high speed, and can provide films excellent not only in mechanical strength properties (particularly tensile properties and tear strength), low-temperature heat sealability and heat-sealing stability but also in slip properties and blocking resistance thereby being excellent in suitability for high-speed filling upon packaging by automatic filling machines.

DETAILED DESCRIPTION OF THE INVENTION

The resin compositions and use thereof according to the invention will be described in detail hereinafter.

Resin Composition (Soft Resin Composition)

The resin composition of the invention (including the soft resin composition and the polyethylene resin composition hereinafter) comprises a polyethylene resin (A) and a linear ethylene/α-olefin random copolymer (B) in a specific ratio.

The soft resin composition is first described, and the polyethylene resin composition is then described.

Polyethylene Resin (A)

The polyethylene resin (A) used in the invention may be an ethylene homopolymer or a random copolymer of ethylene and an α-olefin, preferably ethylene and an α-olefin of 3 to 20 carbon atoms. Further, the polyethylene resin (A) may be linear or branched.

Examples of the α-olefins of 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used in combination thereof.

The polyethylene resin (A) used in the invention has MFR (melt flow rate, ASTM D 1238, 190° C., load of 2.16 kg) of 0.1 to 200 g/10 min. When the polyethylene resin (A) has MFR of 1 to 150 g/10 min, preferably 1.5 to 100 g/10 min, more preferably 1.5 to 50 g/10 min, it is used to form a soft resin composition showing excellent moldability and capable of providing molded products of excellent pliability and mechanical strength properties.

The polyethylene resin (A) has a density of 0.901 to 0.970 g/cm$^3$, preferably 0.905 to 0.940 g/cm$^3$.

The density is determined in the following manner. Strands obtained in the measurement of melt flow rate (MFR) at 190° C. under a load of 2.16 kg are heat-treated at 120° C. for 1 hour, then slowly cooled to room temperature over a period of 1 hour and measured on the density by means of a gradient density tube.

The polyethylene resin (A) can be prepared by a conventionally known process.

The polyethylene resin (A) can be obtained by, for example, copolymerizing ethylene and an α-olefin of 3 to 20 carbon atoms in the presence of a transition metal catalyst. The density of the linear ethylene/α-olefin copolymer is controlled by the kind of the α-olefin and the amount thereof copolymerized, and the melt flow rate of the copolymer is controlled by the kind of a chain transfer agent and the amount thereof.

There is no specific limitation on the catalyst or the polymerization process. For example, as a catalyst Ziegler-Natta catalyst, Phillips catalyst and metallocene catalyst are employable. The Ziegler-Natta catalyst is, for example, an olefin polymerization catalyst comprising a Group IV transition metal compound (Ti or Zr type) or a Group V transition metal compound (V type), and an organoaluminum compound. Examples of the polymerization processes include slurry polymerization process, gas-phase polymerization process and solution polymerization process.

Ethylene/α-olefin Random Ccopolymer (B)

The ethylene/α-olefin random copolymer (B) used in the invention is a linear ethylene/α-olefin random copolymer comprising ethylene and an α-olefin of 6 to 20 carbon atoms.

Examples of the α-olefins of 6 to 20 carbon atoms include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins may be used in combination thereof.

The ethylene/α-olefin random copolymer (B) may contain other constituent units than those derived from the α-olefins, e.g., constituent units derived from the diene compounds, within limits not prejudicial to the objects of the present invention.

Examples of the constituent units derived from diene compounds include:

those derived from chain nonconjugated diene compounds, such as 1,4-hexadiene, 1,6-octadiene, 2-methyl-1,5-hexadiene, 6-methyl-1,5-heptadiene and 7-methyl-1,6-octadiene, those derived from cyclic nonconjugated diene compounds, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and those derived from other diene compounds, such as 2,3-diisopropylidene-5-norbornene, 2-ethylidene-3-isopropylidene-5-norbornene and 2-propenyl-2,2-norbornadiene.

The diene compounds to derive the above constituent units may be used singly or in combination. The content of the diene compound is generally not more than 10%, preferably 0 to 5%.

The ethylene/α-olefin random copolymer (B) has a density of 0.870 to 0.900 g/cm$^3$.

The ethylene/α-olefin random copolymer (B) has an intrinsic viscosity (η), as measured in decalin at 135° C., of 0.3 to 3.0 dl/g, preferably 0.5 to 2.0 dl/g. The ethylene/α-olefin random copolymer (B) having an intrinsic viscosity in the above range has good blending properties with the polyethylene resin (A). When this ethylene/α-olefin random copolymer (B) is used, a resin composition (including a soft resin composition and a polyethylene resin composition, the same shall apply hereinafter) having excellent flowability and moldability can be obtained.

The ethylene/α-olefin random copolymer (B) has a glass transition temperature (Tg), as determined by DSC (differential scanning calorimeter), of not higher than −50° C.

The ethylene/α-olefin random copolymer (B) has a crystallinity, as measured by X-ray diffractometry, of less than 40%, preferably not more than 30%. When the ethylene/α-olefin random copolymer (B) having a crystallinity of less than 40% is used, a resin composition having good pliability can be obtained.

The ethylene/α-olefin random copolymer (B) desirably has a molecular weight distribution (Mw/Mn), as measured by GPC, of not more than 3.0, and has a parameter (B value), which indicates a copolymerized monomer sequence distribution and determined by $^{13}$C-NMR, of 1.0 to 1.4.

The B value of the ethylene/α-olefin random copolymer (B) is an index of a composition distribution of constituent units derived from each monomer in the copolymer sequences, and can be calculated by the following equation:

$$B = P_{OE}/(2P_O \cdot P_E)$$

wherein $P_E$ is a molar fraction of an ethylene component contained in the ethylene/α-olefin random copolymer, $P_O$ is a molar fraction of an α-olefin component contained therein, and $P_{OE}$ is a proportion of the number of ethylene/α-olefin alternating sequences to the number of all the dyad sequences.

The values for $P_E$, $P_O$ and $P_{OE}$ can be determined in the following manner.

In a test tube having a diameter of 10 mmφ, about 200 mg of an ethylene/α-olefin random copolymer is homogeneously dissolved in 1 ml of hexachlorobutadiene to give a sample. A $^{13}$-NMR spectrum of this sample is obtained by measuring the sample under the following measuring conditions.

Measuring Conditions

Measuring temperature: 120° C.

Measuring frequency; 20.05 MHz

Spectrum width: 1,500 Hz

Filter width: 1,500 Hz

Pulse repetition time: 4.2 sec

Pulse width: 7 μsec

Integration times: 2,000 to 5,000

The $P_E$, $P_O$ and $P_{OE}$ values can be found from the $^{13}$C-NMR spectrum in accordance with the reports by G. J. Ray (Macromolecules, 10, 773 (1977)), J. C. Randall (Macromolecules, 15, 353 (1982)) and K. Kimura (Polymer, 25, 441 (1984)).

The B value determined by the above equation becomes 2 when the both monomers are alternately distributed in the ethylene/α-olefin copolymer, and it becomes 0 when the both monomers are perfectly separately distributed to form a perfect block copolymer.

When the ethylene/α-olefin random copolymer (B) having a B value in the above range is used, a resin composition capable of providing molded products having high heat resistance can be obtained.

The linear ethylene/α-olefin random copolymer has a gη* value, as determined by the intrinsic viscosity (η), of more than 0.95.

The gη* is specifically determined by the following equation:

$$g\eta^* = (\eta)/(\eta)_{blank}$$

wherein (η) is an intrinsic viscosity of the ethylene/α-olefin random copolymer (B) as measured in decalin at 135° C., and $(\eta)_{blank}$ is an intrinsic viscosity of a linear ethylene/propylene copolymer having the same weight-average molecular weight (measured by a light scattering method) as the ethylene/α-olefin random copolymer and having an ethylene content of 70% by mol.

When a linear ethylene/α-olefin random copolymer having the above properties is used, a resin composition capable of providing molded products having excellent mechanical strength properties and heat resistance can be obtained.

Preparation of Ethylene/α-olefin Random Copolymer (B)

The linear ethylene/α-olefin random copolymer (B) having the above properties can be prepared by random copolymerizing ethylene and an α-olefin of 6 to 20 carbon atoms in the presence of a metallocene catalyst containing a specific metallocene compound.

The metallocene catalyst used herein is not specifically limited except that it contains a metallocene compound [A]. For example, the metallocene catalyst may be formed from a metallocene compound [A], an organoaluminum oxy-compound [B] and/or a compound which reacts with the metallocene compound [A] to form an ion pair [C], or the metallocene catalyst may contain an organoaluminum compound [D] in addition to the metallocene compound [A], the organoaluminum oxy-compound [B] and/or the compound which reacts with the metallocene compound [A] to form an ion pair [C].

Metallocene Compound [A]

The metallocene compound [A] used in the preparation of the linear ethylene/α-olefin random copolymer rubber (B) used in the invention is, for example, a compound represented by the following formula (I).

$$ML_x \tag{I}$$

In the formula (I), M is a transition metal selected from Group IVB of the periodic table, specifically, zirconium, titanium or hafnium, and x is a valence of the transition metal.

L is a ligand coordinated to the transition metal. At least one ligand L is a ligand having cyclopentadienyl skeleton, and the ligand having cyclopentadienyl skeleton may have a substituent.

Examples of the ligands having cyclopentadienyl skeleton include cyclopentadienyl group; alkyl or cycloalkyl substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylnexylcyclopentadienyl, methylbenzylcyclopentadienyl, ethylbutylcyclopentadienyl, ethylhexylcyclopentadienyl and methylcyclohexylcyclopentadienyl; indenyl group; 4,5,6,7-tetrahydroindenyl group; and fluorenyl group.

These groups may be substituted with halogen atoms or trialkylsilyl groups.

Of the above groups, particularly preferable are alkyl substituted cyclopentadienyl groups.

When the compound represented by the formula (I) has two or more groups having cyclopentadienyl skeleton as the ligands L, two of them may be bonded to each other through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

Examples of L other than the ligand having cyclopentadienyl skeleton (sometimes referred to simply as "other L" hereinafter) include hydrocarbon groups of 1 to 12 carbon atoms, alkoxy groups, aryloxy groups, halogen atoms, hydrogen atom and sulfonic acid-containing groups (—SO$_3$R$^a$ wherein the R$^a$ is an alkyl group, an alkyl group substituted with a halogen atom, an aryl group, or an aryl group substituted with a halogen atom or an alkyl group).

Examples of the hydrocarbon groups of 1 to 12 carbon atoms include alkyl groups, cycloalkyl groups, aryl groups and aralkyl groups.

More specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the sulfonic acid-containing group (—SO$_3$R$^a$) include methanesulfonato, p-toluenesulfonato, trifluoromethanesulfonate and p-chlorobenzenesulfonato.

Examples of the halogen atoms include fluorine, chlorine, bromine and iodine.

The metallocene compound of the above formula wherein the valence of the transition metal is 4 is more specifically represented by the following formula (II):

$$R^2_k R^3_l R^4_m R^5_n M \qquad (II)$$

wherein M is the above-mentioned transition metal, $R^2$ is a group (ligand) having cyclopentadienyl skeleton, $R^3$, $R^4$ and $R^5$ are each independently a group having cyclopentadienyl skeleton or the "other L" in the above formula (I), k is an integer of not less than 1, and k+l+m+n =4.

Listed below are examples of the metallocene compounds containing zirconium as M and containing at least two ligands having cyclopentadienyl skeleton.

Bis(cyclopentadienyl)zirconium monochloride monohydride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)zirconium phenoxymonochloride,
Bis(methylcyclopentadienyl)zirconium dichloride,
Bis(ethylcyclopentadienyl)zirconium dichloride,
Bis(n-propylcyclopentadienyl)zirconium dichloride,
Bis(isopropylcyclopentadienyl)zirconium dichloride,
Bis(t-butylcyclopentadienyl)zirconium dichloride,
Bis(n-butylcyclopentadienyl)zirconium dichloride,
Bis(sec-butylcyclopentadienyl)zirconium dichloride,
Bis(isobutylcyclopentadienyl)zirconium dichloride,
Bis(hexylcyclopentadienyl)zirconium dichloride,
Bis(octylcyclopentadienyl)zirconium dichloride,
Bis(indenyl)zirconium dichloride,
Bis(4,5,6,7-tetrahydroindenyl)zirconium dichloride,
Bis(indenyl)zirconium dibromide,
Bis(cyclopentadienyl)zirconium dimethyl,
Bis(cyclopentadienyl)zirconium methoxychloride,
Bis(cyclopentadienyl)zirconium ethoxychloride,
Bis(fluorenyl)zirconium dichloride,
Bis(cyclopentadienyl)zirconiumbis(methanesulfonato),
Bis(cyclopentadienyl)zirconiumbis(p-toluenesulfonato),
Bis(cyclopentadienyl)zirconiumbis(trifluoromethanesulfonato),
Bis(methylcyclopentadienyl)zirconiumbis(trifluoromethanesulfonato),
Bis(ethylcyclopentadienyl)zirconiumbis(trifluoromethanesulfonato),
Bis(propylcyclopentadienyl)zirconiumbis(trifluoromethanesulfonato),
Bis(butylcyclopentadienyl)zirconiumbis(trifluoromethanesulfonato),
Bis(hexylcyclopentadienyl)zirconiumbis(trifluoromethanesulfonato),
Bis(1,3-dimethylcyclopentadienyl)zirconiumbis(trifluoromethanesulfonato),
Bis(1-methyl-3-ethylcyclopentadienyl)zirconiumbis(trifluoromethanesulfonato),
Bis(1-methyl-3-propylcyclopentadienyl)zirconiumbis(trifluoromethanesulfonato),
Bis(1-methyl-3-butylcyclopentadienyl)zirconiumbis(trifluoromethanesulfonato),
Bis(1,3-dimethylcyclopentadienyl)zirconium dichloride,
Bis(1-methyl-3-ethylcyclopentadienyl)zirconium dichloride,
Bis(1-methyl-3-propylcyclopentadienyl)zirconium dichloride,
Bis(1-methyl-3-butylcyclopentadienyl)zirconium dichloride,
Bis(1-methyl-3-hexylcyclopentadienyl)zirconium dichloride,
Bis(1-methyl-3-octylcyclopentadienyl)zirconium dichloride,
Bis(1-ethyl-3-butylcyclopentadienyl)zirconium dichloride,
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(methylbenzylcyclopentadienyl)zirconium dichloride,
Bis(ethylhexylcyclopentadienyl)zirconium dichloride, and
Bis(methylcyclohexylcyclopentadienyl)zirconium dichloride.

Also employable in the invention are compounds wherein the 1,3-position substituted cyclopentadienyl group is replaced with a 1,2-position substituted cyclopentadienyl group in the above-exemplified compounds.

Further, also employable is a bridge type metallocene compound represented by the above formula (II) wherein at least two of $R^2$, $R^3$, $R^4$ and $R^5$, e.g., $R^2$ and $R^3$, are groups (ligands) having cyclopentadienyl skeleton, and these at least two groups are bonded to each other through an alkylene group, a substituted alkylene group, a silylene group or a substituted silylene group. In this case, $R^4$ and $R^5$ are each independently the "other L", which is described for the formula (I);

Listed below are examples of such bridge type metallocene compounds.

Ethylenebis(indenyl)dimethylzirconium,
Ethylenebis(indenyl)zirconium dichloride,
Ethylenebis(indenyl)zirconiumbis(trifluoromethanesulfonato),
Ethylenebis(indenyl)zirconiumbis(methanesulfonato),
Ethylenebis(indenyl)zirconiumbis(p-toluenesulfonato),
Ethylenebis(indenyl)zirconiumbis(p-chlorobenzenesulfonato),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconiumbis(trifluoromethanesulfonato),
Dimethylsilylenebis(4,5,6,7-tetrahydroindenyl)zirconium dichloride,
Dimethylsilylenebis(cyclopentadienyl-fluorenyl)zirconium dichloride,
Diphenylsilylenebis(indenyl)zirconium dichloride, and
Methylphenylsilylenebis(indenyl)zirconium dichloride.

Furthermore, a metallocene compound of the following formula (A), which is described in Japanese Patent Laid-Open Publication No. 268307/1992, is also employable.

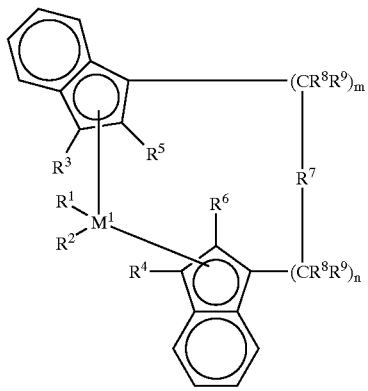
(A)

In the formula (A), $M^1$ is a metal of Group IVB of the periodic table, specifically, titanium, zirconium or hafnium.

$R^1$ and $R^2$ may be the same as or different from each other, and are each hydrogen, or an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atoms, an alkylaryl group of 7 to 40 carbon atoms, preferably 7 to 12 carbon atoms, an arylalkenyl group of 8 to 40 carbon atoms, preferably 8 to 12 carbon atoms, or a halogen atom, preferably chlorine atom.

$R^3$ and $R^4$ may be the same as or different from each other, and are each hydrogen or a halogen atom, preferably fluorine, chlorine or bromine atom or an alkyl group of 1 to 10 carbon atoms, preferably 1 to 4 carbon atoms, which may be halogenated, an aryl group of 6 to 10 carbon atoms, preferably 6 to 8 carbon atoms, or a group of $-NR^{10}_2$, $-SR^{10}$, $-OSiR^{10}_3$, $-SiR^{10}_3$ or $-PR^{10}_2$ (the $R^{10}$ is a halogen atom, preferably chlorine atom, an alkyl group of 1 to 10 carbon atoms, preferably 1 to 3 carbon atoms, or an aryl group of 6 to 10 carbon atoms, preferably 6 to 8 carbon atoms).

$R^3$ and $R^4$ are each preferably hydrogen atom.

$R^5$ and $R^6$ may be the same as or different from each other, preferably the same as each other, and $R^5$ and $R^6$ are the same as $R^3$ and $R^4$, but each of $R^5$ and $R^6$ is not hydrogen atom. $R^5$ and $R^6$ are each preferably an alkyl group of 1 to 4 carbon atoms which may be halogenated, specifically, methyl, ethyl, propyl, isopropyl, butyl, isobutyl or trifluoromethyl, preferably methyl.

$R^7$ is represented by the following formulae:

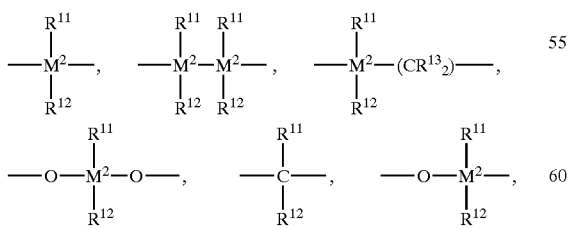

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$ wherein the $R^{11}$, $R^{12}$ and $R^{13}$ may be the same as or different from each other; and they are each hydrogen or a halogen atom, or an alkyl group of 1 to 10 carbon atoms, preferably 1 to 4 carbon atoms, more preferably methyl, a fluoroalkyl group of 1 to 10 carbon atoms, preferably $CF_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms; or $R^{11}$ and $R^{12}$ or $R^1$ and $R^{13}$ may form a ring together with an atom to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same as or different from each other, and they are the same as $R^{11}$.

m and n may be the same as or different from each other, and are each 0, 1 or 2, preferably 0 or 1, and m+n is 0, 1 or 2, preferably 0 or 1.

Particularly preferred metallocene compounds satisfying the above conditions are those represented by the following formulae (i) to (iii).

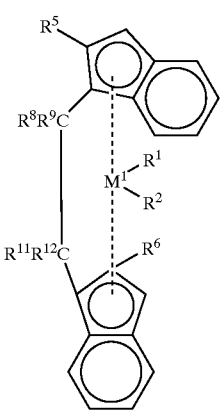
(i)

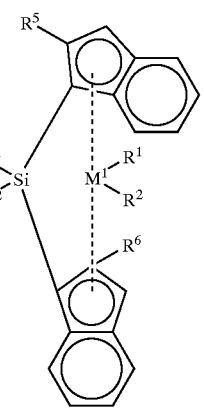
(ii)

-continued

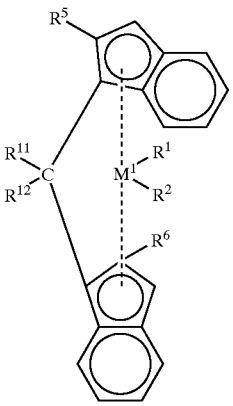

(iii)

In the above formulae (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{11}$ and $R^{12}$ are the same as ones described above.

Of the compounds represented by the formulae (i), (ii) and (iii), the following compounds are particularly preferable.

rac-Ethylene(2-methyl-1-indenyl)$_2$-zirconium dichloride,
rac-Dimethylsilylene(2-methyl-1-indenyl)$_2$-zirconium dichloride,
rac-Dimethylsilylene(2-methyl-1-indenyl)$_2$-zirconium dimethyl,
rac-Ethylene(2-methyl-1-indenyl)$_2$-zirconium dimethyl,
rac-Phenyl(methyl)silylene-(2-methyl-1-indenyl)$_2$-zirconium dichloride,
rac-Diphenyl-silylene-(2-methyl-1-indenyl)$_2$-zirconium dichloride,
rac-Methylethylene(2-methyl-1-indenyl)$_2$-zirconium dichloride, and
rac-Dimethylsilylene (2-ethyl-1-indenyl)$_2$-zirconium dichloride.

The metallocene compounds mentioned above can be prepared by conventionally known processes (see: Japanese Patent Laid-Open Publication No. 268307/1992).

In the present invention, a transition metal compound (metallocene compound) represented by the following formula (B) is also employable.

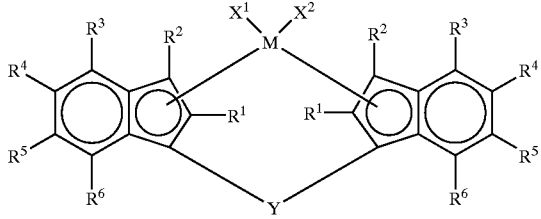

(B)

In the formula (B), M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include those wherein the above-exemplified hydrocarbon groups are substituted with halogen atoms.

Examples of the silicon-containing groups include monohydrocarbon-substituted silyl groups, such as methylsilyl and phenylsilyl; dihydrocarbon-substituted silyl groups, such as dimethylsilyl and diphenylsilyl; trihydrocarbon-substituted silyl groups, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of the hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms, i.e., methyl, ethyl or propyl. $R^2$ is preferably hydrogen or a hydrocarbon group, particularly preferably hydrogen or a hydrocarbon group of 1 to 3 carbon atoms, i.e., methyl, ethyl or propyl.

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, hydrogen, the hydrocarbon group or the halogenated hydrocarbon group is preferable. At least one pair out of pairs of $R^3$ and $R^4$, $R^4$ and $R^5$, and $R^5$ and $R^6$ may form a monocyclic aromatic ring together with a carbon atom to which they are bonded.

When there are two or more hydrocarbon groups or halogenated hydrocarbon groups, the groups other than those for forming the aromatic ring may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are the same as those described for $R^1$ and $R^2$.

Examples of the ligands, which contain a monocyclic aromatic ring formed by at least one pair of $R^3$ and $R^4$, $R^4$ and R⁵, and R⁵ and R⁶ and which is coordinated to M, include the following ones.

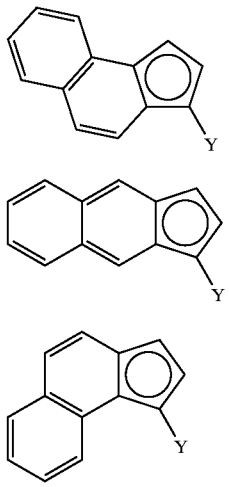

Of these, the ligand represented by the formula (1) is preferable.

The aromatic ring may be substituted with a halogen atom, a hydrocarbon group of 1 to 20 carbon atoms or a halogenated hydrocarbon group of 1 to 20 carbon atoms.

Examples of the halogen atoms, the hydrocarbon groups of 1 to 20 carbon atoms and the halogenated hydrocarbon groups of 1 to 20 carbon atoms used as the substituents of the aromatic ring are the same as those described for $R^1$ and $R^2$.

$X^1$ and $X^2$ are each independently hydrogen or a halogen atom, or a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are the same as those described for $R^1$ and $R^2$.

Examples of the sulfur-containing groups include the same groups as described for $R^1$ and $R^2$; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO₂—, —NR⁷—, —P(R⁷)—, —P(O)(R⁷)—, —BR⁷— or —AlR⁷— (the $R^7$ is hydrogen or a halogen atom, or a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

$R^7$ is the same halogen atom, hydrocarbon group of 1 to 20 carbon atoms or halogenated hydrocarbon group of 1 to 20 carbon atoms as described for $R^1$ or $R^2$.

Of the above groups, preferable are divalent silicon-containing groups, divalent germanium-containing groups and divalent tin-containing group, and more preferable are divalent silicon-containing groups. Among them, particularly preferable are alkylsilylene groups, alkylarylsilylene groups and arylsilylene groups.

Listed below are examples of the transition metal compounds represented by the formula (B).

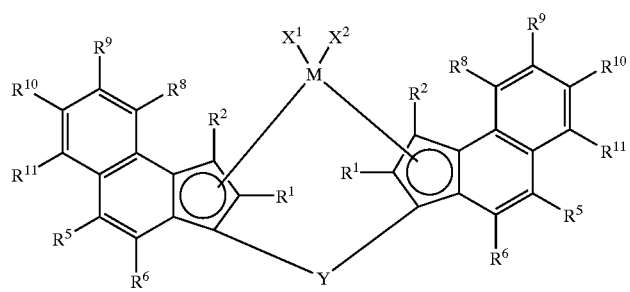

| $R^1$ | $R^2$ | $R^5$ | $R^6$ | $R^8$ | $R^9$ | $R^{10}$ | $R^{11}$ | Y | $X^1$ | $X^2$ | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |

-continued

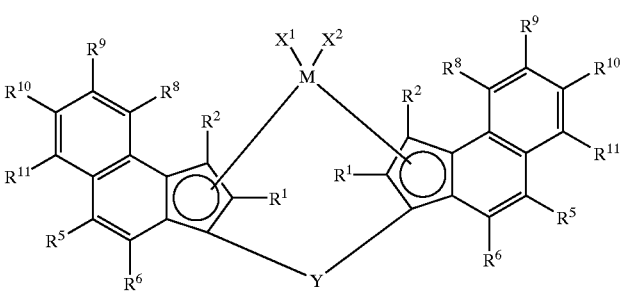

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(pMePh)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₄ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| C₆H₅ | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | C₆H₅ | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | C₆H₅ | SiMe₂ | Cl | Cl | Zr |

*¹R⁵ and R¹¹ are bonded to each other to form a five-membered ring.
Me: methyl; Ph: phenyl.

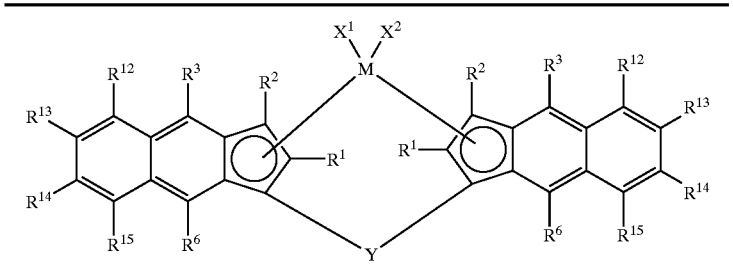

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiPh₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²R³ and R¹², and R⁶ and R¹⁵ are bonded to each other to form a five-membered ring, respectively.
Me: methyl; Ph: phenyl

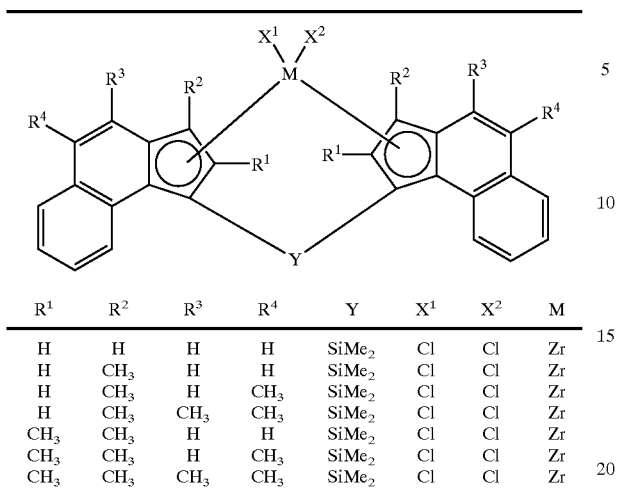

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

A racemic modification of the transition metal compound is generally used as the olefin polymerization catalyst component, but R type or S type is also employable.

The indene derivative ligands of the transition metal compounds can be synthesized in accordance with ordinary organic synthesis through, for example, the reaction route described below.

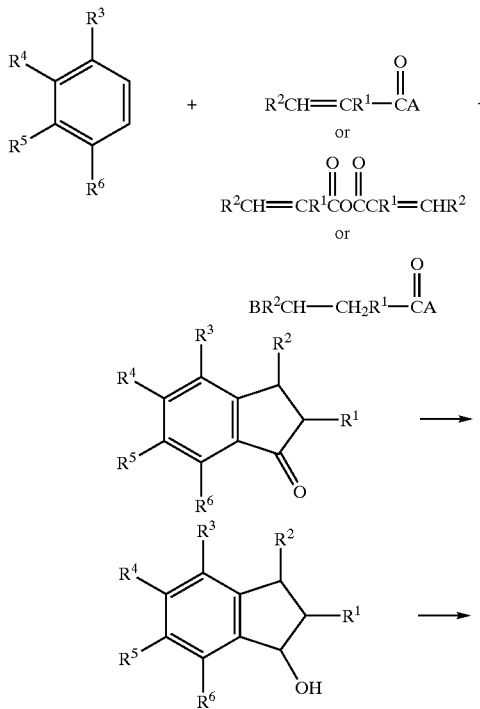

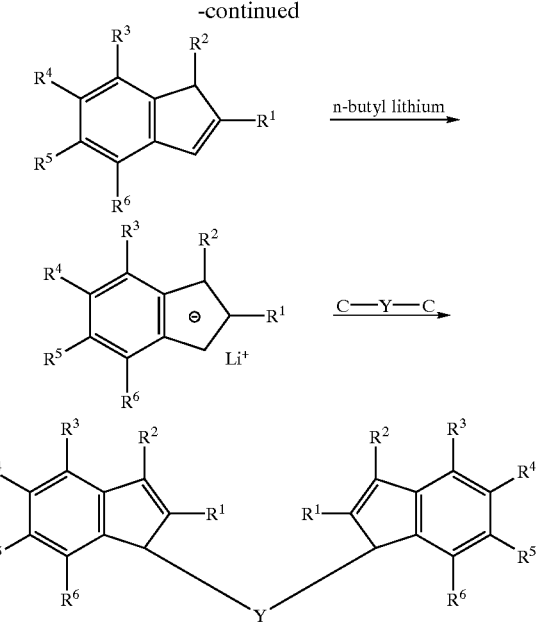

A, B and C represent halogen atoms.

The transition metal compounds employable in the invention can be synthesized from these indene derivatives in accordance with conventionally known processes, for example, a process described in Japanese Patent Laid-Open Publication No. 268307/1992.

In the present invention, a transition metal compound (metallocene compound) represented by the following formula (C) is also employable.

(C)

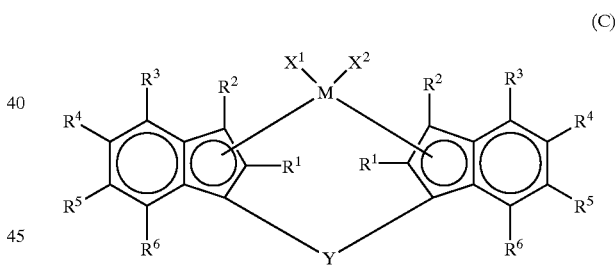

In the formula (C), M, $R^1$, $R^2$, $R^3$, $R^4$, $R^5$ and $R^6$ are the same as those in the aforesaid formula (B).

Among $R^3$, $R^4$, $R^5$ and $R^6$, two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and they may be substituted with halogen atoms or silicon-containing groups. Examples of the halogen atoms and the silicon-containing groups include the same substituents as described for $R^1$ and $R^2$.

Of the groups indicated by $R^3$, $R^4$, $R^5$ and $R^6$, groups other than the alkyl groups are each preferably hydrogen.

When each $R^3$, $R^4$, $R^5$ and $R^6$ is the hydrocarbon groups of 1 to 20 carbon atoms, examples of such groups include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, decyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are the same as those described for $R^1$ and $R^2$.

$X^1$, $X^2$, Y and $R^7$ are the same as those in the aforesaid formula (B).

Listed below are examples of the metallocene compounds (transition metal compounds) represented by the formula (C).

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilyl-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4,6-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium or hafnium in the above-exemplified compounds.

A racemic modification of the transition metal compound is generally used, but R type or S type is also employable.

The indene derivative ligands of the transition metal compounds can be synthesized in accordance with ordinary organic synthesis through, for example, the reaction route previously described.

The transition metal compounds (metallocene compounds) represented by the formula (C) can be synthesized from these indene derivatives in accordance with conventionally known processes, for example, a process described in Japanese Patent Laid-Open Publication No. 268307/1992.

Of the metallocene compounds mentioned above, compounds represented by the following formulas (III) and (IV) are particularly preferably employed. The metallocene compounds represented by the formula (III) are included in the compounds represented by the formula (C), and the metallocene compounds represented by the formula (IV) are included in the compounds represented by the formula (B).

(III)

In the formula (III), M is a transition metal atom of Group IVB of the periodic table, specifically titanium, zirconium or hafnium, preferably zirconium.

$R^{11}$ and $R^{12}$ $R^{11}$ and $R^{12}$ are each hydrogen, a halogen atom, a hydrocarbon group of 1 to 20 carbon atoms which may be substituted with halogen, a silicon-containing group, an oxygen-containing group, a sulfur-containing group, a nitrogen-containing group or a phosphorus-containing group.

Examples of the hydrocarbon groups of 1 to 20 carbon atoms include:

alkyl groups, such as methyl, ethyl, propyl, n-butyl, isobutyl, sec-butyl, tert-butyl, pentyl, neopentyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms such as fluorine, chlorine, bromine and iodine, or organosilyl groups such as trimethylsilyl, triethylsilyl and triphenylsilyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino.

Of these, $R^{11}$ is preferably a hydrocarbon group, particularly a hydrocarbon group of 1 to 3 carbon atoms, i.e., methyl, ethyl or propyl.

$R^{12}$ is preferably hydrogen atom or a hydrocarbon group, particularly hydrogen or a hydrocarbon group of 1 to 3 carbon atoms, i.e., methyl, ethyl or propyl.

$R^{13}$ and $R^{14}$ $R^{13}$ and $R^{14}$ are each an alkyl group of 1 to 20 carbon atoms, and examples thereof are the same as those described above. $R^{13}$ is preferably a secondary or tertiary alkyl group. $R^{14}$ may contain a double bond or a triple bond.

$X^1$ and $X^2$ $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group. Examples of these groups are the same as those described above. $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (The R$^{15}$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; and alkyldisilyl, alkylaryldisilyl and aryldisilyl groups, such as tetramethyl-1,2-disilyl and tetraphenyl-1,2-disilyl.

Examples of the divalent germanium-containing groups or the divalent tin-containing groups include those each wherein silicon is replaced with germanium or tin, respectively, in the above-exemplified divalent silicon-containing groups.

R$^{15}$ is the same halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group.

Listed below are examples of the metallocene compounds represented by the formula (III), rac-Dimethylsilylene-bis(2,7-dimethyl-4-ethyl-1-indenyl) zirconium dichloride, rac-Dimethylsilylene-bis(2,7-dimethyl-4-n-propyl-1-indenyl)zirconium dichloride, rac-Dimethylsilylene-bis(2,7-dimethyl-4-i-propyl-1-indenyl)zirconium dichloride, rac-Dimethylsilylene-bis(2,7-dimethyl-4-n-butyl-1-indenyl) zirconium dichloride, rac-Dimethylsilylene-bis(2,7-dimethyl-4-sec-butyl-1-indenyl)zirconium dichloride, rac-Dimethylsilylene-bis(2,7-dimethyl-4-t-butyl-1-indenyl) zirconium dichloride, rac-Dimethylsilylene-bis(2,7-dimethyl-4-n-pentyl-1-indenyl)}zirconium dichloride, rac-Dimethylsilylene-bis(2,7-dimethyl-4-n-hexyl-1-indenyl)zirconium dichloride, rac-Dimethylsilylene-bis(2,7-dimethyl-4-cyclohexyl-1-indenyl)zirconium dichloride, rac-Dimethylsilylene-bis(2,7-dimethyl-4-methylcyclohexyl-1-indenyl)}zirconium dichloride, rac-Dimethylsilylene-bis(2,7-dimethyl-4-phenylethyl-1-indenyl)zirconium dichloride, rac-Dimethylsilylene-bis(2,7-dimethyl-4-phenyldichloromethyl-1-indenyl)zirconium dichloride,
rac-Dimethylsilylene-bis(2,7-dimethyl-4-chloromethyl-1-indenyl)zirconium dichloride,
rac-Dimethylsilylene-bis(2,7-dimethyl-4-trimethylsilylmethyl-1-indenyl)zirconium dichloride,
rac-Dimethylsilylene-bis(2,7-dimethyl-4-trimethylsiloxymethyl-1-indenyl)zirconium dichloride,
rac-Diethylsilylene-bis(2,7-dimethyl-4-i-propyl-1-indenyl)zirconium dichloride,
rac-Di(i-propyl)silylene-bis(2,7-dimethyl-4-i-propyl-1-indenyl)}zirconium dichloride,
rac-Di(n-butyl)silylene-bis(2,7-dimethyl-4-i-propyl-1-indenyl)zirconium dichloride,
rac-Di(cyclohexyl)silylene-bis(2,7-dimethyl-4-i-propyl-1-indenyl)zirconium dichloride,
rac-Methylphenylsilylene-bis(2,7-dimethyl-4-i-propyl-1-indenyl)zirconium dichloride,
rac-Methylphenylsilylene-bis(2,7-dimethyl-4-t-butyl-1-indenyl)zirconium dichloride,
rac-Diphenylsilylene-bis(2,7-dimethyl-4-t-butyl-1-indenyl)zirconium dichloride,
rac-Diphenylsilylene-bis(2,7-dimethyl-4-i-propyl-1-indenyl)zirconium dichloride,
rac-Diphenylsilylene-bis(2,7-dimethyl-4-ethyl-1-indenyl)zirconium dichloride,
rac-Di(p-tolyl)silylene-bis(2,7-dimethyl-4-i-propyl-1-indenyl)zirconium dichloride,
rac-Di(p-chlorophenyl)silylene-bis(2,7-dimethyl-4-i-propyl-1-indenyl)zirconium dichloride,
rac-Dimethylsilylene-bis(2-methyl-4-i-propyl-7-ethyl-1-indenyl)zirconium dibromide,
rac-Dimethylsilylene-bis(2,3,7-trimethyl-4-ethyl-1-indenyl)zirconium dichloride,
rac-Dimethylsilylene-bis(2,3,7-trimethyl-4-n-propyl-1-indenyl)zirconium dichloride,
rac-Dimethylsilylene-bis(2,3,7-trimethyl-4-i-propyl-1-indenyl)zirconium dichloride,
rac-Dimethylsilylene-bis(2,3, 7-trimethyl-4-n-butyl-1-indenyl)zirconium dichloride,
rac-Dimethylsilylene-bis(2, 3, 7-trimethyl-4-sec-butyl-1-indenyl)zirconium dichloride,
rac-Dimethylsilylene-bis(2,3,7-trimethyl-4-t-butyl-1-indenyl)zirconium dichloride,
rac-Dimethylsilylene-bis(2,3,7-trimethyl-4-n-pentyl-1-indenyl)zirconium dichloride,
rac-Dimethylsilylene-bis(2,3,7-trimethyl-4-n-hexyl-1-indenyl)zirconium dichloride,
rac-Dimethylsilylene-bis(2,3, 7-trimethyl-4-cyclohexyl-1-indenyl)zirconium dichloride,
rac-Dimethylsilylene-bis(2,3,7-trimethyl-4-methylcyclohexyl-1-indenyl)zirconium dichloride,
rac-Dimethylsilylene-bis(2,3,7-trimethyl-4-trimethylsilylmethyl-1-indenyl)zirconium dichloride,
rac-Dimethylsilylene-bis(2,3,7-trimethyl-4-trimethylsiloxymethyl-1-indenyl)zirconium dichloride,
rac-Dimethylsilylene-bis(2,3,7-trimethyl-4-phenylethyl-1-indenyl)zirconium dichloride,
rac-Dimethylsilylene-bis(2,3,7-trimethyl-4-phenyldichloromethyl-1-indenyl)zirconium dichloride,
rac-Dimethylsilylene-bis(2,3,7-trimethyl-4-chloromethyl-1-indenyl)zirconium dichloride,
rac-Diethylsilylene-bis(2,3,7-trimethyl-4-i-propyl-1-indenyl)zirconium dichloride,
rac-Di(i-propyl)silylene-bis(2,3,7-trimethyl-4-i-propyl-1-indenyl)zirconium dichloride,
rac-Di(n-butyl)silylene-bis(2,3,7-trimethyl-4-i-propyl-1-indenyl)zirconium dichloride,
rac-Di(cyclohexyl)silylene-bis(2,3,7-trimethyl-4-i-propyl-1-indenyl)zirconium dichloride,
rac-Methylphenylsilylene-bis(2,3,7-trimethyl-4-i-propyl-1-indenyl)zirconium dichloride,
rac-Methylphenylsilylene-bis(2,3,7-trimethyl-4-t-butyl-1-indenyl)zirconium dichloride,
rac-Diphenylsilylene-bis(2,3,7-trimethyl-4-t-butyl-1-indenyl)zirconium dichloride,
rac-Diphenylsilylene-bis(2,3,7-trimethyl-4-i-propyl-1-indenyl)zirconium dichloride,
rac-Diphenylsilylene-bis(2,3,7-trimethyl-4-ethyl-1-indenyl)zirconium dichloride,
rac-Di(p-tolyl)silylene-bis(2,3,7-trimethyl-4-i-propyl-1-indenyl)zirconium dichloride,
rac-Di(p-chlorophenyl)silylene-bis(2,3,7-trimethyl-4-i-propyl-1-indenyl)zirconium dichloride,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-7-methyl-1-indenyl)zirconium dichloride,
rac-Dimethylsilylene-bis(2-ethyl-4-i-propyl-7-methyl-1-indenyl)zirconium dichloride,
rac-Dimethylsilylene-bis(2-phenyl-4-i-propyl-7-methyl-1-indenyl)zirconium dichloride,
rac-Dimethylsilylene-bis(2-methyl-4-i-propyl-7-methyl-1-indenyl)titanium dichloride, and
rac-Dimethylsilylene-bis(2-methyl-4-i-propyl-7-methyl-1-indenyl)hafnium dichloride.

Of these, particularly preferable are compounds having a branched alkyl group such as i-propyl, sec-butyl or tert butyl at the 4-position.

In the invention, a racemic modification of the above-mentioned metallocene compound is generally used as the olefin polymerization catalyst component, but R type or S type is also employable.

The metallocene compounds can be synthesized from indene derivatives by known processes, for example, a process described in Japanese Patent Laid-Open Publication No. 268307/1992.

In the present invention, a compound represented by the following formula (IV), which is described in European Patent No. 549,900 and Canadian Patent No. 2,084,017, is also preferably employed.

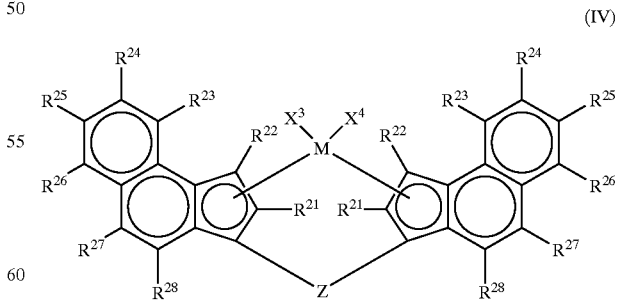

In the formula (IV), M is a transition metal atom of Group IVB of the periodic table, specifically titanium, zirconium or hafnium, particularly preferably zirconium.

$R^{21}$ may be the same as or different from each other, and are each hydrogen or a halogen atom, or preferably fluorine or chlorine, an alkyl group of 1 to 10 carbon atoms, preferably 1 to 4 carbon atoms, which may be halogenated, an aryl group of 6 to 10 carbon atoms, preferably 6 to 8 carbon atoms, —$NR_2$, —SR, —$OSiR_3$, —$SiR_3$ or —$PR_2$ (The R is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^{22}$ to $R^{28}$ may be the same as or different from each other, and are each the same atom or group as described for $R^{21}$, and adjacent two or more groups out of $R^{22}$ to $R^{28}$ may form an aromatic or aliphatic ring together with an atom to which they are bonded.

$X^3$ and $X^4$ may be the same as or different from each other, and are each hydrogen or a halogen atom, or OH group, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atoms, an alkylaryl group of 7 to 40 carbon atoms, preferably 7 to 12 carbon atoms, or an arylalkenyl group of 8 to 40 carbon atoms, preferably 8 to 12 carbon atoms.

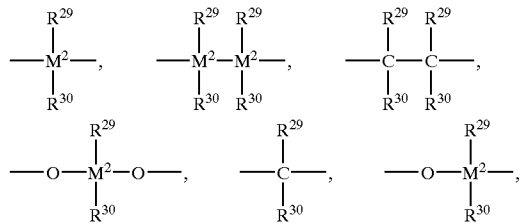

=$BR^{29}$, =$AlR^{29}$, —Ge, —Sn—, —O—, —S—, =SO, —$SO_2$, =$NR^{29}$, =CO, =$PR^{29}$ or =p(O)$R^{29}$.

In the above formulas, $R^{29}$ and $R^{30}$ may be the same as or different from each other, and are each hydrogen or a halogen atom or an alkyl group of 1 to 10 carbon atom, preferably 1 to 4 carbon atoms, particularly preferably methyl, a fluoroalkyl group of 1 to 10 carbon atoms, preferably $CF_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms.

$R^{29}$ and $R^{30}$ may form a ring together with an atom to which they are bonded.

$M^2$ is silicon, germanium or tin.

The alkyl group is a straight chain or branched alkyl group, and the halogen (for halogenation) is fluorine, chlorine, bromine or iodine, preferably fluorine or chlorine.

Of the compounds of the formula (IV), preferable are those wherein M is zirconium or hafnium; $R^{21}$s are the same as each other, and are each an alkyl group of 1 to 4 carbon atoms; $R^{22}$ to $R^{28}$ may be the same as or different from each other, and are each hydrogen atom or an alkyl group of 1 to 4 carbon atoms; $X^3$ and $X^4$ may be the same as or different from each other, and are each an alkyl group of 1 to 3 carbon atoms or a halogen atom; and Z is

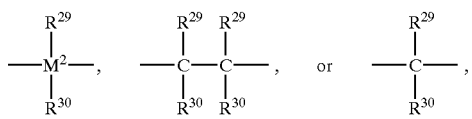

($M^2$ is silicon, and $R^{29}$ and $R^{30}$ may be the same as or different from each other, and are each an alkyl group of 1 to 4 carbon atom or an aryl group of 6 to 10 carbon atoms).

Among such compounds, more preferable are those wherein the substituents $R^{22}$ and $R^{28}$ are each hydrogen atom, and $R^{23}$ to $R^{27}$ are each an alkyl group of 1 to 4 carbon atoms or hydrogen atom.

Still more preferable are compounds wherein M is zirconium; $R^{21}$s are the same as each other, and are each an alkyl group of 1 to 4 carbon atoms; $R^{22}$ and $R^{28}$ are each hydrogen; $R^{23}$ to $R^{27}$ may be the same as or different from each other, and are each an alkyl group of 1 to 4 carbon atoms or hydrogen atom; $X^3$ and $X^4$ are each chlorine; and Z is

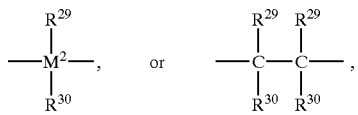

($M^2$ is silicon, and $R^{29}$ and $R^{30}$ may be the same as or different from each other, and are each an alkyl group of 1 to 4 carbon atom or an.aryl group of 6 to 10 carbon atoms).

Particularly preferable are compounds wherein M is zirconium; $R^{21}$s are each methyl; $R^{22}$ to $R^{28}$ are each hydrogen; $X^3$ and $X^4$ are chlorine; and Z is

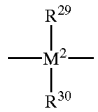

($M^2$ is silicon, and $R^{29}$ and $R^{30}$ may be the same as or different from each other, and are each methyl or phenyl).

Listed below are some examples of the compounds represented by the formula (IV), rac-Dimethylsilylene-bis{1-(2-methyl-4,5-benzoindenyl)}zirconium dichloride,
rac-Dimethylsilylene-bis{1-(2-methyl-4,5-acenaphthocyclopentadienyl)}zirconium dichloride,
rac-Dimethylsilylene-bis{1-(2,3,6-trimethyl-4,5-benzoindenyl)}zirconium dichloride,
rac-Methylphenylsilylene-bis{1-(2-methyl-4,5-benzoindenyl)}zirconium dichloride,
rac-Methylphenylsilylene-bis{1-(2-methyl-4,5-acenaphthocyclopentadienyl)}zirconium dichloride,
rac-Methylphenylsilylene-bis{1-(1-(4,5-benzoindenyl)}zirconium dichloride,
rac-Methylphenylsilylene-bis{1- (2,6-dimethyl-4,5-benzoindenyl)}zirconium dichloride, and
rac-Methylphenylsilylene-bis{1-(2,3,6-trimethyl-4,5-benzoindenyl)}zirconium dichloride.

Also employable are compounds wherein zirconium is replaced with titanium or hafnium in the above-exemplified compounds.

In the invention, a racemic modification of the metallocene compound represented by the formula (III) or (IV) is generally used as the catalyst component, but R type or S type is also employable.

The metallocene compounds mentioned above can be used in combination of two or more kinds.

Organoaluminum Oxy-compound [B]

The organoaluminum oxy-compound [B] used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the compound or the salt, followed by recovering aluminoxane as its hydrocarbon solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and then the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferable are trialkylaluminums and tricycloalkylaluminums.

Also employable as the organoaluminum compound used for preparing the aluminoxane is isoprenylaluminum represented by the formula $(i—C_4H_9)_xAl_y(C_5H_{10})_z$ (wherein x, y, z are each a positive number, and $z \geq 2x$).

The organoaluminum compounds mentioned above can be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halides of these aromatic, aliphatic and alicyclic hydrocarbons, particularly chlorides and bromides thereof.

Also employable are ethers such as ethyl ether and tetrahydrofuran.

Of the solvents, particularly preferable are aromatic hydrocarbons.

Compound which Reacts with the Metallocene Compound [A] to form an Ion Pair [C]

The compound which reacts with the metallocene compound [A] to form an ion pair (sometimes referring to the compound [C]) includes Lewis acid, ionic compounds, borane compounds and carborane compounds described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 5,321,106.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

$$BR^1R^2R^3$$

wherein $R^1$, $R^2$ and $R^3$ are each independently a phenyl group which may have a substituent such as fluorine atom or methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the metallocene compound [A] to render the compound [A] cationic and to form an ion pair, thereby to stabilize the transition metal cation seed. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation.

More specifically, there can be mentioned triphenylcarbenium cation, tributylammonium cation, N,N-dimethylammonium cation, ferrocenium cation, etc.

In the invention, ionic compounds containing an organoboron compound anion are preferred, and examples thereof include:

trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl) boron, tri(n-butyl)ammoniumtetra(o-tolyl)boron and tri (n-butyl)ammoniumtetra(4-fluorophenyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron;

dialkylammonium salts, such as di(n-propyl) ammoniumtetra(pentafluorophenyl)boron and dicyclohexylammoniumtetra(phenyl)boron; and triarylphosphonium salts, such as triphenylphosphoniumtetra(phenyl)boron, tri (methylphenyl)phosphoniumtetra(phenyl)boron and tri (dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate are also employable in the invention.

Further, the following ionic compounds containing a boron atom are also employable. (In the ionic compounds enumerated below, the counter ion is tri(n-butyl)ammonium, but the counter ion is in no way limited thereto.)

That is, there can be mentioned salts of anion, for example, bis[tri(n-butyl)ammonium]nonaborate, bis[tri(n-butyl)ammonium]decaborate, bis[tri(n-butyl)ammonium] undecaborate, bis[tri(n-butyl)ammonium]dodecaborate, bis [tri(n-butyl)ammonium]decachlorodecaborate, bis[tri(n-butyl)ammoniumjdodecachlorododecaborate, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate. Moreover, the following borane compounds and carborane compounds are also employable. These compounds are used as the Lewis acid or the ionic compounds.

Examples of borane compounds, carborane complex compounds and salts of carborane anions include decaborane (14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl) ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate.

Examples of carborane compounds and salts of carboranes include 4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carboranes and metallic borane anions, for example, tri(n-butyl) ammoniumbis(nonahydride-1,3-dicarbanonaborate) cobaltate(III), tri(n-butyl)ammoniumbis(undecahydride-7, 8-dicarbaundecaborate)ferrate(III), tri(n-butyl) ammoniumbis(undecahydride-7,8-dicarbaundecaborate) cobaltate(III), tri(n-butyl)ammoniumbis(undecahydride-7, 8-dicarbaundecaborate)nickelate(III), tri(n-butyl) ammoniumbis(undecahydride-7,8-dicarbaundecaborate) cuprate(III), tri(n-butyl)ammoniumbis(undecahydride-7,8-dicarbaundecaborate)aurate(III), tri(n-butyl)ammoniumbis (nonahydride-7,8-dimethyl-7,8-dicarbaundecaborate)ferrate (III), tri(n-butyl)ammoniumbis(nonahydride-7,8-dimethyl-7,8-dicarbaundecaborate)chromate(III), tri(n-butyl) ammoniumbis(tribromooctahydride-7,8-dicarbaundecaborate)cobaltate(III), tri(n-butyl) ammoniumbis(dodecahydridedicarbadodecaborate) cobaltate(III), bis[tri(n-butyl)ammonium]bis (dodecahydridedodecaborate)nickelate(III), tris[tri(n-butyl) ammonium]bis(undecahydride-7-carbaundecaborate) chromate(III), bis(tri(n-butyl)ammonium]bis (undecahydride-7-carbaundecaborate)manganate(IV), bis [tri(n-butyl)ammonium]bis(undecahydride-7-carbaundecaborate)cobaltate(III) and bis[tri(n-butyl) ammoniumjbis(undecahydride-7-carbaundecaborate) nickelate(IV).

The compounds [C] mentioned above can be used singly or in combination of two or more kinds.

Organoaluminum Compound [D]

The organoaluminum compound [D] used in the invention can be represented by, for example, the following general formula (a):

$$R^5_n AlX_{3-n} \qquad (a)$$

wherein $R^5$ is a hydrocarbon group of 1 to 12 carbon atoms, X is a halogen or hydrogen atom, and n is 1 to 3.

In the formula (a), $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum a and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diibsobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichoride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and disobutylaluminum hydride.

Also employable as the organoaluminum compound [D] is a compound represented by the following formula (b):

$$R^5_n AlY_{3-n} \qquad (b)$$

wherein $R^5$ is the same as $R^5$ in the formula (a); Y is —$OR^6$ group, —$OSiR^7{}_3$ group, —$OAlR^8{}_2$ group, —$NR^9{}_2$ group, —$SiR^{10}{}_3$ group or —$N(R^{11})AlR^{12}{}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen atom or methyl, ethyl, isopropyl, phenyl, trimethylsilyl or the like; and $R^{10}$ and $R^{11}$ are each methyl, ethyl or the like.

Examples of such organoaluminum compounds include:

(i) compounds of the formula $R^5{}_nAl(OR^6)_{3-n}$, e.g., dimethylaluminum methoxide, diethylaluminum ethoxide and diisobutylaluminum methoxide;

(ii) compounds of the formula $R^5{}_nAl(OSiR^7{}_3)_{3-n}$, e.g., $(C_2H_5)_2Al(OSi(CH_3)_3)$, $(iso-C_4H_9)_2Al(OSi(CH_3)_3)$ and $(iso-C_4H_9)_2Al(OSi(C_2H_5)_3)$;

(iii) compounds of the formula $R^5{}_nAl(OAlR^8{}_2)_{3-n}$, e.g., $(C_2H_5)_2Al(OAl(C_2H_5)_2)$ and $(iso-C_4H_9)_2Al(OAl(iso-C_4H_9)_2)$;

(iv) compounds of the formula $R^5{}_nAl(NR^9{}_2)_{3-n}$, e.g., $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso-C_4H_9)_2Al[N(Si(CH_3)_3)_2]$, and (v) compounds of the formula $R^5{}_nAl(SiR^{10}{}_3)_{3-n}$, e.g., $(iso-C_4H_9)_2Al(Si(CH_3)_3)$.

Of these, preferable are organoaluminum compounds of the formulae $R^5{}_3Al$, $R^5{}_nAl(OR^6)_{3-n}$ and $R^5{}_nAl(OAlR^8{}_2)_{3-n}$, and particularly preferred are compounds of said formulae wherein $R^5$ is an isoalkyl group and n is 2. The organoaluminum compounds mentioned above can be used in combination of two or more kinds.

The specific metallocene catalyst employable in the invention contains the metallocene compound [A], and the catalyst can be formed from, for example, the metallocene compound [A] and the organoaluminum oxy-compound [B] as mentioned above. The metallocene catalyst may be formed from the metallocene compound [A] and the compound which reacts with the compound [A] to form an ion pair [C], or it may be formed from the metallocene compound [A], the organoaluminum oxy-compound [B] and the compound [C]. In these embodiments, it is particularly preferable to further use the organoaluminum compound [D] in combination.

In the present invention, the metallocene compound [A] is used in an amount of usually about 0.00005 to 0.1 mmol, preferably about 0.0001 to 0.05 mmol, in terms of the transition metal atom, based on 1 liter of the polymerization volume.

The organoaluminum oxy-compound [B] is used in such an amount that the amount of the aluminum atom becomes usually about 1 to 10,000 mol, preferably 10 to 5,000 mol, per 1 mol of the transition metal atom.

The compound [C] is used in such an amount that the amount of the boron atom becomes usually about 0.5 to 20 mol, preferably 1 to 10 mol, based on 1 mol of the transition metal atom.

The organoaluminum compound [D] is optionally used in an amount of usually about 0 to 1,000 mol, preferably about 0 to 500 mol, based on 1 mol of the aluminum atom in the organoaluminum oxy-compound [B] or the boron atom in the compound [C].

By copolymerizing ethylene and an α-olefin of 6 to 20 carbon atoms using the above-mentioned metallocene catalyst, the linear ethylene/α-olefin random copolymer can be obtained with sufficiently high polymerization activities.

However, even if ethylene and an α-olefin of 6 to 20 carbon atoms are copolymerized using a Group VB transition metal compound catalyst such as a vanadium catalyst, it is impossible to obtain the linear ethylene/α-olefin random copolymer with sufficiently high polymerization activity.

In the copolymerization of ethylene and an α-olefin of 6 to 20 carbon atoms, the metallocene compound [A], the organoaluminum oxy-compound [B] and the compound [C], and optionally, the organoaluminum compound [D], all of which constitute the metallocene catalyst, may be separately fed to the polymerization reactor, or a preliminarily prepared metallocene catalyst containing the metallocene compound [A] may be added to the polymerization reaction system.

In the preparation of the metallocene catalyst, hydrocarbon solvents which are inert to the catalyst components can be employed. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound [A], the organoaluminum oxy-compound [B], the compound [C] and the organoaluminum compound [D] can be contacted with each other at a temperature of usually −100 to 200° C., preferably −70 to 100° C.

In the present invention, copolymerization of ethylene and the α-olefin of 6 to 20 carbon atoms can be carried out under the conditions of a temperature of usually 40 to 200° C., preferably 50 to 150° C., particularly preferably 60 to 120° C., and a pressure of atmospheric pressure to 100 kg/cm², preferably atmospheric pressure to 50 kg/cm², particularly preferably atmospheric pressure to 30 kg/cm².

This polymerization reaction can be conducted by various polymerization processes, but it is preferably conducted by a solution polymerization process. In the solution polymerization process, the aforesaid hydrocarbon solvents are employable as the polymerization solvents.

Though the copolymerization can be carried out by any one of batchwise, semi-continuous and continuous processes, it is preferably carried out continuously. The polymerization can be carried out in two more stages each under different reaction conditions.

The linear ethylene/α-olefin random copolymer used in the invention are obtained by the processes mentioned above, and the molecular weight of the copolymer can be modified by varying the polymerization conditions such as polymerization temperature or controlling the amount of hydrogen (molecular weight modifier).

In the resin composition of the invention, the ethylene/α-olefin random copolymer (B) is contained in an amount of 50 to 5,000 parts by weight, based on 100 parts by weight of the polyethylene resin (A). Such resin composition can provide molded products having excellent mechanical strength properties, particularly tensile properties, and high pliability.

Particularly, when the ethylene/α-olefin random copolymer (B) is contained in an amount of 67 to 2,000 parts by weight, preferably 100 to 1,400 parts by weight, more preferably 143 to 1,000 parts by weight, based on 100 parts by weight of the polyethylene resin (A), a soft resin composition having good moldability as well as capable of providing molded products of excellent pliability and tensile properties can be obtained.

In other words, in the soft resin composition, the polyethylene resin (A) is desirably used in an amount of 2 to 200 parts by weight, preferably 5 to 150 parts by weight, more preferably 7 to 100 parts by weight, particularly preferably 10 to 70 parts by weight, based on 100 parts by weight of the ethylene/α-olefin random copolymer (B).

Other Components

To the resin composition of the invention, various additives, such as antioxidant, ultraviolet light absorber, light-protective agent, phosphite type heat stabilizer, peroxide decomposer, basic co-stabilizer, nucleating agent, plasticizer, lubricant, antistatic agent, flame retarder, pigment, dye and filler, may be added within limits not prejudicial to the objects of the present invention.

Examples of the fillers include carbon black, asbestos, talc, silica and silica alumina.

The resin composition of the invention can be compounded with other polymers within limits not prejudicial to the objects of the present invention.

Examples of the other polymers include EPT, polypropylene and various engineering plastic resins (polyamide, polyester, etc.).

Preparation of Resin Composition (Soft Resin Composition)

(1) The (soft) resin composition of the invention is prepared by, for example, melt mixing the ethylene/α-olefin random copolymer (B), the polyethylene resin (A) and the optional additives by various conventional methods.

That is, the (soft) resin composition is obtained by mixing the above components simultaneously or successively in an mixing apparatus such as Henschel mixer, twin-cylinder mixer, tumbling mixer or ribbon mixer, to melt knead the resulting mixture by a kneading apparatus such as single-screw extruder, multi-screw extruder, kneader or Banbury mixer.

If a kneading apparatus having high kneading efficiency, such as extruder, kneader or Banbury mixer, is used, a (soft) resin containing a high-quality polyethylene resin composition wherein each of the components is homogeneously dispersed can be obtained.

The above-mentioned additives, e.g., antioxidant, can be added according to necessity in any optional stage.

The resin composition of the invention obtained as above, particularly the soft resin composition, can be molded into products of various shapes by various melt molding methods conventionally known, such as injection molding, extrusion molding and compression molding.

(2) In the invention, the (soft) resin composition can be also prepared by dissolving the polyethylene resin (A), the ethylene/α-olefin random copolymer (B) and the optional additives in an appropriate good solvent (e.g., hydrocarbon solvents such as hexane, heptane, decane, cyclohexane, benzene, toluene and xylene), to remove the solvent from the solution.

(3) Such (soft) resin compostion can also prepared by dissolving the polyethylene resin (A), the ethylene/α-olefin random copolymer (B) and the optional additives, separately, in an appropriate good solvent, then mixing the resulting solutions to remove the solvents from the obtained mixture.

(4) The above processes (1) to (3) may be also carried out in optional combination.

Next, the polyethylene resin composition of the invention and use thereof are described in detail.

Polyethylene Resin Composition

In the polyethylene resin composition of the invention, the polyethylene resin (A) and the ethylene/α-olefin random copolymer (B) are contained.

The components and their proportions of the polyethylene resin (A-β) and the ethylene/α-olefin random copolymer (B-β) preferably used for preparing the polyethylene resin composition, properties thereof, preparation process, etc. are described below. Unless otherwise noted, they are identical with those of the aforementioned polyethylene resin (A) and ethylene/α-olefin random copolymer (B), with the exception of the following items.

Polyethylene Resin (A-β)

The polyethylene resin (A-β) used in the invention is preferably a linear copolymer of ethylene and an α-olefin of 3 to 20 carbon atoms. Of the α-olefins exemplified above, propylene, 1-butene, 1-pentene, 1-hexene, 4-methyl-1-pentene, 1-octene, 1-decene and mixtures thereof are preferable.

The polyethylene resin (A-β) has a density of 0.901 to 0.970 g/cm$^3$, preferably 0.901 to 0.940 g/cm$^3$.

The polyethylene resin (A-β) has MFR (melt flow rate, ASTM D 1238, 190° C., load of 2.16 kg) of 0.1 to 200 g/10 min, preferably 0.2 to 100 g/10 min, more preferably 0.5 to 20 g/10 min.

When the polyethylene resin (A-β) having the properties such as density and MFR in the above range is used, a polyethylene resin composition having excellent melt flowability (as described hereinbelow in detail), pliability and mechanical strength properties and, particularly, suitable for producing a film, can be obtained.

As described previously, the polyethylene resin (A-β) for use in the invention can be prepared by a conventional process using an olefin polymerization catalyst comprising a Group IV or V transition metal compound and an organoaluminum compound, namely, a conventionally known olefin polymerization catalyst of Ti, V or Zr type.

Ethylene/α-olefin Random Copolymer (B-β)

The ethylene/α-olefin random copolymer (B-β) is preferably an ethylene/α-olefin random copolymer comprising not less than 50% by mol of ethylene and not more than 50% by mol of an α-olefin of 6 to 20 carbon atoms.

The ethylene/α-olefin random copolymer (B-β) has a density is 0.870 to 0.900 g/cm$^3$, preferably 0.875 to 0.895 g/cm$^3$.

The ethylene/α-olefin random copolymer (B-β) has a melt flow rate (MFR) of 0.1 to 100 g/10 min, preferably 0.1 to 70 g/10 min, more preferably 0.3 to 50 g/10 min. The ethylene/α-olefin random copolymer (B-β) having a melt flow rate in the above range shows good blending properties with the polyethylene resin (A-β).

The ethylene/α-olefin random copolymer (B-β) can be prepared by the use of a conventional vanadium catalyst or a metallocene catalyst of a Group IVB transition metal compound. The ethylene/α-olefin random copolymer prepared by the use of the metallocene catalyst is preferable, because a polyethylene resin composition containing the ethylene/α-olefin random copolymer prepared by the use of the metallocene catalyst can provide films of higher tear strength as compared with a polyethylene resin composition containing the ethylene/α-olefin random copolymer prepared by the use of the vanadium catalyst.

The ethylene/α-olefin random copolymer (B-β) used in the invention is an ethylene/α-olefin random copolymer having, in addition to the above properties, the same intrinsic viscosity (η), glass transition temperature, crystallinity, molecular weight distribution (Mw/Mn) and B value as described above. Particularly, the ethylene/α-olefin random copolymer (B-β) preferably is a linear ethylene/α-olefin random copolymer having, in addition to those properties, the same gη* value as described above.

The ethylene/α-olefin random copolymer (B-β) can be prepared by the process similar to the aforementioned one.

Polyethylene Resin Composition

As stated above, the polyethylene resin composition of the invention comprises the polyethylene resin (A-β) and the ethylene/α-olefin random copolymer (B-β).

In the polyethylene resin composition, the ethylene/α-olefin random copolymer (B-β) is used in an amount of 2 to 66 parts by weight, preferably 5 to 53 parts by weight, more preferably 7 to 42 parts by weight, based on 100 parts by weight of the polyethylene resin (A-β).

In other words, based on 100 parts by weight of the total of the polyethylene resin (A-β) and the ethylene/α-olefin random copolymer (B-β), the ethylene/α-olefin random copolymer (B-β) is used in an amount of 2 to 40 parts by weight, preferably 5 to 35 parts by weight, more preferably 7 to 30 parts by weight, and the polyethylene resin (A-β) is used in an amount of 60 to 98 parts by weight, preferably 65 to 95 parts by weight, more preferably 70 to 93 parts by weight.

If the polyethylene resin (A-β) and the ethylene/α-olefin random copolymer (B-β) are used in the above proportions, a polyethylene resin composition showing good moldability as well as capable of providing molded products of excellent pliability and tensile properties can be obtained. The polyethylene resin composition having the above component proportions is excellent in pliability and tensile properties and is particularly suitable for producing a film as described hereinbelow in detail.

To the polyethylene resin composition of the invention, various additives such as antioxidant may be added within limits not prejudicial to the objects of the present invention, similarly to the aforementioned resin composition.

Preparation of Polyethylene Resin Composition

The polyethylene resin composition of the invention is prepared by melt mixing the polyethylene resin (A-β), the ethylene/α-olefin random copolymer (B-β) and the optional additives by the aforesaid various conventional processes.

The polyethylene resin composition of the invention prepared as above mentioned can be molded into films by means of conventional molding methods such as air-cooling inflation, air-cooling two-stage inflation, high-speed inflation, T-die film molding and water-cooling inflation.

The films formed by the above methods are well-balanced between transparency and rigidity and have excellent heat sealability, hot tack properties and heat resistance, which are features of conventional LLDPE.

The polyethylene resin composition of the invention can be molded into products of various shapes other than film shape, e.g., bottle shape, by various melt molding methods conventionally known, such as injection molding, extrusion molding and compression molding.

EFFECT OF THE INVENTION

From the resin composition of the invention, molded products of excellent pliability and tensile properties can be formed.

Particularly, the soft resin composition of the invention has high melt flowability, namely, high moldability, and can provide molded products of excellent pliability and tensile properties.

The polyethylene resin composition of the invention has high melt flowability, namely, high moldability, and can provide molded products such as films of excellent pliability and mechanical properties, particularly tensile properties and tear strength.

Further, the polyethylene resin composition of the invention has excellent heat stability and high-speed moldability and can provide films excellent not only in low-temperature heat sealability and heat-sealing stability but also in slip properties and blocking resistance thereby being excellent in handling properties and suitability for high-speed filling upon packaging by automatic filling machines.

The film of the invention formed from the polyethylene resin composition is suitable for standard bags, heavy-duty bags, wrapping films, lamination sheets, sugar bags, oil bags, water bags, various packaging films such as food packaging films, infusion bags and agricultural materials. This film can be used as a multi-layer film by laminating it on a substrate of nylon, polyester or the like.

In addition to the above uses, the polyethylene resin composition of the invention can be used also for blow molded transfusion bags, blow molded bottles, extrusion molded tubes, pipes, pull-off caps, injection molded products such as daily miscellaneous goods, fibers and large-sized products formed by rotomolding.

EXAMPLE

The present invention will be further described with reference to the following examples, but it should be construed that the invention is in no way limited to those examples.

Example 1

Preparation of Ethylene/1-octene Random Copolymer
Preparation of Catalyst Solution To a glass flask thoroughly purged with nitrogen was fed 0.5 mg of bis(1,3-dimethylcyclopentadienyl)zirconium dichloride. To the flask were then added 1.57 ml of a toluene solution of methylaluminoxane (Al: 1.1 mol/l) and 2.76 ml of toluene, to obtain a catalyst solution.

Polymerization

To a 2 liter-stainless steel autoclave thoroughly purged with nitrogen were introduced 600 ml of hexane and 400 ml of 1-octene. The temperature of the system was raised to 80° C. Then, 1 mmol of triisobutylaluminum and 0.5 ml (0.001 mmol in terms of Zr) of the catalyst solution obtained above were injected into the autoclave together with ethylene, to initiate polymerization. Thereafter, only ethylene was continuously fed to keep the total pressure at 4.0 Kg/cm$^2$-G, and polymerization was performed at 90° C. for 30 minutes. After a small amount of ethanol was purged to the system to terminate the polymerization, the unreacted ethylene was purged out. The reaction solution was introduced into a large excess of methanol to precipitate a polymer. The polymer was separated and recovered by filtration and dried overnight under reduced pressure, to obtain a linear ethylene/1-octene random copolymer.

The copolymer thus obtained had a 1-octene content of 10% by mol, MFR (ASTM D 1238, 190° C., a load of 2.16 kg) of 4.7 g/10 min, a density of 0.885 g/cm$^3$, an intrinsic viscosity (η), as measured in decalin at 135° C., of 1.5 dl/g, a glass transition temperature (Tg) of −58° C., a crystallinity, as measured by X-ray diffractometry, of 14%, a molecular weight distribution (Mw/Mn), as measured by GPC, of 2.5, a B value of 1.03 and a gη* value of 1.00.

Preparation of Soft Resin Composition Containing Polyethylene Resin

100 Parts by weight of pellets of the ethylene/1-octene random copolymer and 45 parts by weight of a low-density polyethylene resin (trade name: Mirason-27, available from Mitsui Petrochemical Industries, Ltd., MFR (190° C., a load of 2.16 kg): 2.0 g/10 min, density: 0.918 g/cm$^3$) were mixed by a Henschel mixer, to prepare a dry blend.

Then, the dry blend was fed to a single-screw extruder (L/D=27, diameter: 30 mmφ) preset at 180° C., to prepare pellets of a soft resin composition.

The pellets of the soft resin composition were molded under the following conditions to give a specimen (pressed sheet) for property test.

Conditions for Preparing Pressed Sheet
  Pressed sheet size: 200 mm×200 mm×2 mm (thickness)
  Mold temperature: 200° C.
  Press pressure: 160 kg/cm$^2$
  Pressing time: 10 min
  Cooling time under pressure: 5 minutes
  Cooing temperature: 20° C.
  Then, properties of the soft resin composition were evaluated in the following manner.
(1) MFR
  The MFR was measured in accordance with ASTM D 1238 (temperature: 190° C., load: 2.16 kg)
(2) Torsional rigidity
  The torsional rigidity of the pressed sheet was measured in accordance with ASTM D 1043.
(3) Tensile properties
  100% modulus, stress at break, elongation at break and Young's modulus of the above pressed sheet were measured in accordance with JIS K 7113-2.
  The results are set forth in Table 1.

Comparative Example 1

Polymerization was carried out in the same manner as in Example 1 except that 1-butene was used in place of 1-octene, and the polymerization pressure and the polymerization temperature were varied to 20 Kg/cm$^2$-G and 110° C., respectively, to obtain an ethylene/1-butene random copolymer.

The copolymer thus obtained had a 1-butene content of 12% by mol, MFR (190° C., a load of 2.16 Kg) of 3.6 g/10 min, a density of 0.886 g/cm$^3$, an intrinsic viscosity (η), as measured in decalin at 135° C., of 1.5 dl/g, a glass transition temperature (Tg) of −57° C., a crystallinity, as measured by X-ray diffractometry, of 10%, a molecular weight distribution (Mw/Mn), as measured by GPC, of 2.2, a B value of 1.02 and a gη* value of 1.00.

A soft resin composition containing polyethylene resin was prepared with using the ethylene/1-butene random copolymer, and MFR, torsional rigidity, 100% modulus, stress at break, elongation at break and Young's modulus were measured in the same manner as in Example 1.

The results are set forth in Table 1.

TABLE 1

|  | unit | Ex.1 | Comp. Ex.1 |
|---|---|---|---|
| Ethylene/α-olefin random copolymer |  |  |  |
| 1-Octene content | mol % | 10 | — |
| 1-Butene content | mol % | — | 12 |
| MFR | g/10 min | 4.7 | 3.6 |
| Density | g/cm$^3$ | 0.885 | 0.886 |
| Intrinsic viscosity (η) | dl/g | 1.5 | 1.5 |
| Glass transition temperature (Tg) | ° C. | −58 | −57 |
| Crystallinity | % | 14 | 10 |
| Mw/Mn | — | 2.5 | 2.2 |
| B value | — | 1.03 | 1.02 |
| gη* value | — | 1.00 | 1.00 |
| Formulation of soft resin composition |  |  |  |
| Ethylene/α-olefin random copolymer | parts by weight | 100 | 100 |
| polyethylene resin | parts by weight | 45 | 45 |
| Properties of soft resin composition |  |  |  |
| MFR (190° C.) | g/10 min. | 3.0 | 2.8 |
| Torsional rigidity (23° C.) | kg/cm$^2$ | 170 | 170 |
| 100% Modulus | kg/cm$^2$ | 60 | 61 |
| Tensile stress at break | kg/cm$^2$ | 380 | 300 |
| Tensile elongation at break | % | 840 | 710 |
| Young's modulus | kg/cm$^2$ | 720 | 730 |

In the following examples, properties of films were evaluated in the following manner.
(1) Haze
  The haze was measured in accordance with ASTM D 1003.
(2) Blocking tendency
  The blocking tendency was measured in accordance with ASTM D 1893.
(3) Tensile Properties
  As the tensile properties, stress at break and elongation at break in the lengthwise and crosswise directions of the film were measured in accordance with ASTM D 638.
(4) Tear Strength
  The tear strength was measured in accordance with ASTM D 1922.
(5) Heat-sealing Bond Strength
  Films were laid one upon another, heat-sealed at each temperature shown in Table 3 for a heat-sealing time of 1 second under a pressure of 2 Kg/cm$^2$ using a sealing bar having a width of 5 mm, and then spontaneously cooled.

The films thus heat-sealed were cut into specimens each having a width of 15 mm. The heat-sealed parts of each specimen were peeled from each other at a crosshead speed of 300 mm/min to measure peel strength. This peel strength was applied to heat-sealing bond strength.

Example 2

Preparation of Ethylene/1-octene Random Copolymer
Preparation of Catalyst Solution
  To a glass flask thoroughly purged with nitrogen was fed 0.5 mg of bis(1,3-dimethylcyclopentadienyl)zirconium dichloride. To the flask were then added 1.57 ml of a toluene solution of methylaluminoxane (Al: 1.1 mol/l) and 2.76 ml of toluene, to obtain a catalyst solution.
Polymerization
  To a 2 liter-stainless steel autoclave thoroughly purged with nitrogen were introduced 600 ml of hexane and 400 ml of 1-octene. The temperature of the system was raised to 80° C. Then, 1 mmol of triisobutylaluminum and 0.5 ml (0.001 mmol in terms of Zr) of the catalyst solution obtained above were injected into the autoclave together with ethylene, to initiate polymerization. Thereafter, only ethylene was continuously fed to keep the total pressure at 4.0 Kg/cm$^2$-G, and polymerization was performed at 90° C. for 30 minutes. After a small amount of ethanol was purged to the system to terminate the polymerization, the unreacted ethylene was purged out. The reaction solution was introduced into a large excess of methanol to precipitate a polymer. The polymer was collected by filtration and dried overnight under reduced pressure, to obtain a linear ethylene/1-octene random copolymer.

The copolymer thus obtained had a 1-octene content of 10% by mol, a density of 0.885 g/cm³, MFR (190+ C., a load of 2.16 kg) of 4.7 g/10 min, an intrinsic viscosity (η), as measured in decalin at 135° C., of 1.5 dl/g, a glass transition temperature (Tg) of –58° C., a crystallinity, as measured by X-ray diffractometry, of 14%, a molecular weight distribution (Mw/Mn), as measured by GPC, of 2.5, a B value of 1.03 and a gη* value of 1.00.

The properties of the ethylene/1-octene random copolymer are set forth in Table 2.

Preparation of Polyethylene Resin Composition

10 Parts by weight of pellets of the ethylene/1-octene random copolymer and 90 parts by weight of a linear low-density polyethylene (copolymer mol ratio (ethylene/4-methyl-1-pentene)=96.8 (mol %)/3.2 (mol %)), MFR (190° C., a load of 2.16 kg): 2.1 g/10 min, density: 0.920 g/cm³) were mixed by a Henschel mixer, to prepare a dry blend.

Then, the dry blend was fed to a single-screw extruder (L/D=26, diameter: 40 mmφ) preset at 180° C., to prepare pellets of a polyethylene resin composition.

Film Formation

The polyethylene resin composition was subjected to air-cooling inflation molding with using the single-screw extruder with the diameter of 40 mmφ under the following conditions, to obtain a film having a thickness of 70 μm.

Conditions for Molding

Screw: L/D=25

Die: 75 mmφ (diameter), 1.2 mm (lip width)

Air ring: single-slit air ring

Extrusion rate: 220 g/min

Blow-up ratio: 2.0

Molding temperature: 190° C.

Take-up rate: 7 m/min

The melt properties of the polyethylene resin composition and properties of the film are set forth in Table 3.

Example 3

A polyethylene resin composition was prepared in the same manner as in Example 2 except that the amount of the ethylene/1-octene random copolymer and the amount of the linear low-density polyethylene were varied to 20 parts by weight and 80 parts by weight, respectively. From the polyethylene resin composition, a film having a thickness of 70 μm was formed in the same manner as in Example 2.

The melt properties of the polyethylene resin composition and properties of the film are set forth in. Table 3.

Comparative Example 2

An ethylene/1-butene random copolymer was prepared in the same manner as in the polymerization of Example 2 except that 1-butene was used in place of 1-octene, the polymerization pressure was varied to 20 Kg/cm²-G, and the polymerization temperature was varied to 110° C.

The copolymer thus obtained had a 1-butene content of 12% by mol, a density of 0.886 g/cm³, MFR (190° C., a load of 2.16 kg) of 3.6 g/10 min, an intrinsic viscosity (η), as measured in decalin at 135° C., of 1.5 dl/g, a glass transition temperature (Tg) of –57° C., a crystallinity, as measured by X-ray diffractometry, of 10%, a molecular weight distribution (Mw/Mn), as measured by GPC, of 2.2, a B value of 1.02 and a gη* value of 1.00.

The properties of the ethylene/1-butene random copolymer are set forth in Table 2.

Then, a polyethylene resin composition was prepared in the same manner as in Example 2 except that the ethylene/1-butene random copolymer was used in place of the ethylene/1-octene random copolymer. From the polyethylene resin composition, a film having a thickness of 70 μm was formed in the same manner as in Example 2.

The melt properties of the polyethylene resin composition and properties of the film are set forth in Table 3.

Comparative Example 3

A polyethylene resin composition was prepared in the same manner as in Comparative Example 2 except that the amount of the ethylene/1-butene random copolymer and the amount of the linear low-density polyethylene were varied to 20 parts by weight and 80 parts by weight, respectively. From the polyethylene resin composition, a film having a 20 thickness of 70 μm was formed in the same manner as in Example 2.

The melt properties of the polyethylene resin composition and properties of the film are set forth in Table 3.

TABLE 2

|  | Ethylene/1-octene random copolymer | Ethylene/1-butene random copolymer |
| --- | --- | --- |
| 1-octene content (mol %) | 10 | — |
| 1-butene content (mol %) | — | 12 |
| Density (g/cm³) | 0.885 | 0.886 |
| MFR (g/10 min.) | 4.7 | 3.6 |
| Intrinsic viscosity (η) (dl/g) | 1.5 | 1.5 |
| Grass transition temperature (° C.) | –58 | –57 |
| Crystallinity (%) | 14 | 10 |
| Mw/Mn | 2.5 | 2.2 |
| B value | 1.03 | 1.02 |
| gη* value | 1.00 | 1.00 |

TABLE 3

|  | Ex. 2 | Ex. 3 | Comp. Ex. 2 | Comp. Ex.3 |
| --- | --- | --- | --- | --- |
| Resin composition (parts by weight) |  |  |  |  |
| Ethylene/1-octene random copolymer | 10 | 20 | — | — |
| Ethylene/1-butene random copolymer | — | — | 10 | 20 |
| LLDPE | 90 | 80 | 90 | 80 |
| Film thickness (μm) | 70 | 70 | 70 | 70 |
| Properties of film |  |  |  |  |
| Haze (%) | 17 | 17 | 16 | 17 |
| Blocking tendency (g/cm) | 0.3 | 1.3 | 0.9 | 1.7 |
| Tensile properties |  |  |  |  |
| Stress at break (lengthwise) (MPa) | 41 | 41 | 40 | 39 |
| Elongation at break (lengthwise) (%) | 730 | 760 | 720 | 750 |
| Stress at break (crosswise) (MPa) | 38 | 43 | 33 | 40 |
| Elongation at break (crosswise) (%) | 750 | 790 | 700 | 730 |
| Tear strength (N/cm) |  |  |  |  |
| Lengthwise direction | 1610 | 1720 | 1310 | 1260 |
| Crosswise direction | 1820 | 1960 | 1500 | 1460 |
| Heat-sealing bond strength (N/15 mm) |  |  |  |  |
| 80° C. | 0.3 | 1.1 | 0.3 | 1.3 |
| 85° C. | 0.6 | 1.8 | 0.5 | 4.1 |
| 90° C. | 1.0 | 4.1 | 0.6 | 7.5 |

TABLE 3-continued

|  | Ex. 2 | Ex. 3 | Comp. Ex. 2 | Comp. Ex.3 |
|---|---|---|---|---|
| 100° C. | 6.3 | 9.8 | 7.0 | 10.4 |
| 110° C. | 11.2 | 10.9 | 10.4 | 11.3 |
| 120° C. | 11.9 | 11.5 | 11.1 | 12.1 |
| 130° C. | 13.0 | 12.2 | 12.1 | 13.4 |
| 140° C. | 14.1 | 14.1 | 14.4 | 14.7 |
| 150° C. | 14.0 | 14.1 | 14.1 | 14.4 |

What is claimed is:

1. A soft resin composition comprising:
a polyethylene resin (A-α) in an amount of 100 parts by weight; and
a linear ethylene/α-olefin random copolymer (B-α) comprising ethylene and an α-olefin of 6 to 20 carbon atoms, in an amount of 50 to 5000 parts by weight,
(A) wherein the polyethylene resin (A-α) has:
  (a) an MFR (ASTM D 1238, 190° C., a load of 2.16 kg) of 1 to 150 g/10 min; and
  (b) a density of 0.901 to 0.970 g/cm$^3$, and
(B) wherein the ethylene/α-olefin random copolymer (B-α) has:
  (a) a density of 0.870 to 0.900 g/cm$^3$;
  (b) an intrinsic viscosity (η), as measured in decalin at 135° C., of 0.3 to 3.0 dl/g;
  (c) a glass transition temperature (Tg) of not higher than −50° C.;
  (d) a crystallinity, as measured by X-ray diffractometry, of not more than 30%;
  (e) a molecular weight distribution (Mw/Mn), as measured by GPC, of not more than 3.0;
  (f) a B value, as determined by the $^{13}$C-NMR spectrum of 1.0 to 1.4; and
  (g) a ratio gη* of the intrinsic viscosity (η) of this copolymer determined in the property (b) to the intrinsic viscosity (η)$_{blank}$ of a linear ethylene/propylene copolymer having the same weight-average molecular weight (measured by a light scattering method) as this copolymer and having an ethylene content of 70% by mol, (η)/(η)$_{blank}$, of more than 0.95.

2. A polyethylene resin composition comprising:
a polyethylene resin (A-β) in an amount of 80 to 98 parts by weight; and
an ethylene/α-olefin random copolymer (B-β) comprising ethylene and an α-olefin of 6 to 20 carbon atoms, in an amount of 20 to 2 parts by weight, based on 100 parts by weight of total of the components (A-β) and (B-β);
(A) wherein the polyethylene resin (A-β) is:
  (a) a linear ethylene/α-olefin copolymer comprising ethylene and an α-olefin of 3 to 20 carbon atoms, and has:
  (b) a density of 0.901 to 0.940 g/cm$^3$; and
  (c) a melt flow rate (MFR), as measured at 190° C. under a load of 2.16 kg, of 0.1 to 200 g/10 min, and
(B) wherein the ethylene/α-olefin random copolymer (B-β) has:
  (a) a density of 0.870 to 0.900 g/cm$^3$;
  (b) a melt flow rate (MFR), as measured at 190° C. under a load of 2.16 kg, of 0.1 to 100 g/10 min;
  (c) an intrinsic viscosity (η), as measured in decalin at 135° C., of 0.3 to 3.0 dl/g;
  (d) a glass transition temperature (Tg) of not higher than −50° C.;
  (e) a crystallinity, as measured by X-ray diffractometry, of not more than 30%;
  (f) a molecular weight distribution (Mw/Mn), as measured by GPC, of not more than 3.0;
  (g) a B value, as determined by the $^{13}$C-NMR spectrum of 1.0 to 1.4; and
  (h) a ratio gη* of the intrinsic viscosity (η) of this copolymer determined in the property (c) to the intrinsic viscosity (η)$_{blank}$ of a linear ethylene/propylene copolymer having the same weight-average molecular weight (measured by a light scattering method) as this copolymer and having an ethylene content of 70% by mol, (η)/(η)$_{blank}$, of more than 0.95.

3. The resin composition as claimed in claim 1 wherein the ethylene/α-olefin random copolymer is an ethylene/α-olefin random copolymer obtained by randomly copolymerizing ethylene and an α-olefin of 6 to 20 carbon atoms in the presence of a metallocene catalyst containing a metallocene compound represented by the following formula (III) or (IV):

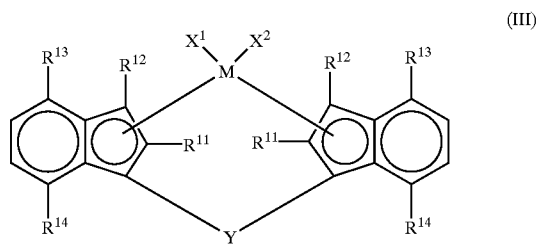

(III)

wherein M is a transition metal of Group IVB of the periodic table, $R^{11}$ and $R^{12}$ are each hydrogen or a halogen atom, or a hydrocarbon group of 1 to 20 carbon atoms which may be substituted with halogen, a silicon-containing group, an oxygen-containing group, a sulfur-containing group, a nitrogen-containing group or a phosphorous-containing group, $R^{13}$ and $R^{14}$ are each an alkyl group of 1 to 20 carbon atoms, $X^1$ and $X^2$ are each hydrogen or a halogen atom, or a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^7$—, —P(R$^7$)—, —P(O) (R$^7$)—, —BR$^7$— or —AlR$^7$— (R$^7$ is hydrogen or a halogen atom, or a hydrocarbon group of 1 to 20 carbon atoms or a halogenated hydrocarbon group of 1 to 20 carbon atoms);

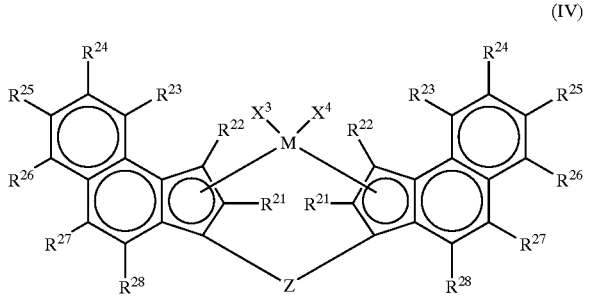

(IV)

wherein M is a transition metal of Group IVB of the periodic table, $R^{21}$ may be the same as or different from each other, and are each hydrogen or a halogen atom, or an alkyl group of 1 to 10 carbon atoms which may be halogenated, an aryl group of 6 to 10 carbon atoms, —$NR_2$—, —SR, —$OSiR_3$, —$SiR_3$ or —$PR_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two groups out of $R^{22}$ to $R^{28}$ may form an aromatic or aliphatic ring together with atoms to which they are bonded, $X^3$ and $X^4$ may be the same as or different from each other, and are each hydrogen or a halogen atom, or OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

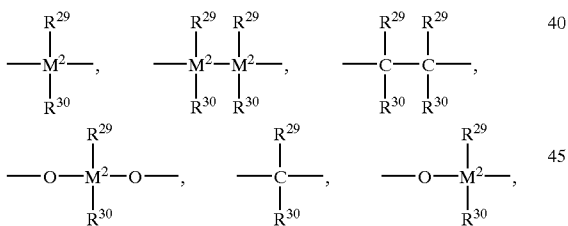

=$BR^{29}$, =$AlR^{29}$, —Ge, —Sn—, —O—, —S—, =SO, —$SO_2$, =$NR^{29}$, =CO, =$PR^{29}$ or =$p(O)R^{29}$ ($R^{29}$ and $R^{30}$ may be the same as or different from each other, and they are each hydrogen or a halogen atom, or an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or $R^{29}$ and $R^{30}$ may form a ring together with atoms to which they are bonded, and $M^2$ is silicon, germanium or tin atom).

4. A film comprising the resin composition as claimed in claim 1.

5. The film as claimed in claim 4, wherein said film is formed by inflation molding.

6. The resin composition of claim 1 or 2, wherein the ethylene/α-olefin random copolymer is a random copolymer comprising ethylene and an α-olefin of 6 to 10 carbon atoms.

7. The resin composition of claim 1 or 2, wherein the ethylene/α-olefin random copolymer is a random copolymer comprising ethylene and an α-olefin of 6 to 10 carbon atoms in an amount of 7 to 42 parts by weight.

8. The resin composition of claim 1 or 2, wherein the ethylene/α-olefin random copolymer is a random copolymer comprising ethylene and an α-olefin of 8 to 10 carbon atoms in an amount of 10 to 20 parts by weight based on 100 parts by weight of the polyethylene resin (A) and the ethylene/α-olefin random copolymer (B).

9. The resin composition of claim 1 or 2, wherein the ethylene/α-olefin random copolymer is a random copolymer comprising ethylene and an α-olefin of 6 to 10 carbon atoms in an amount of 5 to 53 parts by weight.

10. The resin composition of claim 1 or 2, wherein the ethylene/α-olefin random copolymer is a random copolymer comprising ethylene and an α-olefin of 8 to 10 carbon atoms in an amount of 5 to 35 parts by weight based on 100 parts by weight of the polyethylene resin (A) and the ethylene/α-olefin random copolymer (B).

11. A resin composition comprising:

a polyethylene resin (A) in an amount of 100 parts by weight; and a linear ethylene/α-olefin random copolymer (B) comprising ethylene and an α-olefin of 6 to 10 carbon atoms, in an amount of 50 to 5000 parts by weight, wherein the ethylene/α-olefin random copolymer is in an ethylene/α-olefin random copolymer obtained by randomly copolymerizing ethylene and an α-olefin of 6 to 10 carbon atoms in the presence of a metallocene catalyst containing a metallocene compound represented by the following formula (III):

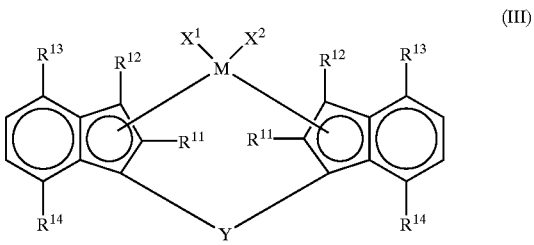

(III)

wherein M is a transition metal selected from the group consisting of titanium, zirconium and hafnium, $R^{11}$ and $R^{12}$ are each hydrogen or a halogen atom, or a hydrocarbon group of 1 to 6 carbon atoms which may be substituted with halogen, $R^{13}$ and $R^{14}$ are each an alkyl group of 1 to 6 carbon atoms, $X^1$ and $X^2$ are each hydrogen or a halogen atom, or a hydrocarbon group of 1 to 6 carbon atoms, a halogenated hydrocarbon group of 1 to 6 carbon atoms, and Y is a divalent hydrocarbon group of 1 to 6 carbon atoms, a divalent halogenated hydrocarbon group of 1 to 6 carbon atoms, a divalent silicon-containing group, and wherein the polyethylene resin (A) has:

(a) an MFR (ASTM D 1238, 190° C., a load of 2.16 kg) of 0.2 to 100 g/10 min; and (b) a density of 0.901 to 0.970 g/cm$^3$, and wherein the ethylene/α-olefin random copolymer (B) has:
(a) a density of 0.870 to 0.900 g/cm$^3$;
(b) an intrinsic viscosity (η), as measured in decalin at 135° C., is 0.3 to 3.0 dl/g;
(c) a glass transition temperature (Tg) or not higher than −50° C.;
(d) a crystallinity, as measured by X-ray diffractometry, of not more than 30%;
(e) a molecular weight distribution (Mw/Mn), as measured by GPC, of not more than 3.0;
(f) a B value, as determined by the $^{13}$C-NMR spectrum and the following equation, of 1.0 to 1.4; and
(g) a ratio gη* of the intrinsic viscosity (η) of this copolymer determined in the property (b) to the intrinsic viscosity (η)$_{blank}$ of a linear ethylene/propylene copolymer having the same weight-average molecular weight (measured by a light scattering method) as this copolymer and having an ethylene content of 70% by mol (η)/(η)$_{blank}$, of more than 0.95, $$B=P_{OE}/(2P_O \cdot P_E)$$

wherein $P_E$ is a molar fraction of an ethylene component contained in the ethylene/α-olefin random copolymer, $P_O$ is a molar fraction of an α-olefin component contained therein, and $P_{OE}$ is a proportion of the number of ethylene/α-olefin alternating sequences to the number of all the dyad sequences.

12. The resin composition of claim 11 wherein the linear ethylene/α-olefin random copolymer is a random copolymer (B) comprising ethylene and an α-olefin of 8 to 10 carbon atoms in an amount of 7 to 42 parts by weight.

13. The resin composition of claim 11 wherein the metallocene catalyst comprises bis(1,3-dimethylcyclopentadienyl)zirconium dichloride.

14. A resin composition comprising
a polyethylene resin (A) in an amount of 45 to 90 parts by weight; and
a linear ethylene/α-olefin random copolymer (B) comprising ethylene and 1-octene molecules, in an amount of 10 to 100 parts by weight, wherein the polyethylene resin (A) has:
(a) an MFR (ASTM D 1238, 190° C., a load of 2.16 kg) of 0.5 to 20 g/10 min; and
(b) a density of 0.901 to 0.940 g/cm$^3$, and
wherein the linear ethylene/α-olefin random copolymer (B) has:
(a) a density of 0.875 to 0.895 g/cm$^3$;
(b) an intrinsic viscosity (η), as measured in decalin at 135° C., is 0.3 to 3.0 dl/g;
(c) a glass transition temperature (Tg) of not higher than −50° C.;
(d) a crystallinity, as measured by x-ray diffractometry, of not more than 30%;
(e) a molecular weight distribution (Mw/Mn), as measured by GPC, of riot more than 3.0;
(f) a B value, as determined by the $^{13}$C-NMR spectrum and the following equation, of 1.0 to 1.4:

$$B=P_{OE}/(2P_O \cdot P_E)$$

wherein $P_E$ is a molar fraction of an ethylene component contained in the ethylene/α-olefin random copolymer, $P_O$ is a molar fraction of an α-olefin component contained therein, and $P_{OE}$ is a proportion of the number of ethylene/α-olefin alternating sequences to the number of all the dyad sequences; and
(g) a ratio of gη* of the intrinsic viscosity (η) of this copolymer determined in the property (b) to the intrinsic viscosity (η)$_{blank}$ of a linear ethylene/propylene copolymer having the same weight-average molecular weight (measured by a light scattering method) as this copolymer and having an ethylene content of 70% by mol, (η)/(η)$_{blank}$, of more than 0.95.

15. The resin composition of claim 14 wherein the polyethylene resin (A) is in an amount of 100 parts by weight; and
the linear ethylene/α-olefin random copolymer (B) comprising ethylene and 1-octene atoms is in an amount of 11 to 222 parts by weight.

* * * * *